US011012715B2

(12) United States Patent
Zhang et al.

(10) Patent No.: US 11,012,715 B2
(45) Date of Patent: May 18, 2021

(54) INTRA BLOCK COPY FOR VIDEO CODING

(71) Applicant: QUALCOMM Incorporated, San Diego, CA (US)

(72) Inventors: Li Zhang, San Diego, CA (US); Kai Zhang, San Diego, CA (US); Wei-Jung Chien, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/269,349

(22) Filed: Feb. 6, 2019

(65) Prior Publication Data

US 2019/0246143 A1    Aug. 8, 2019

Related U.S. Application Data

(60) Provisional application No. 62/628,101, filed on Feb. 8, 2018.

(51) Int. Cl.
| | |
|---|---|
| *H04N 19/105* | (2014.01) |
| *H04N 19/157* | (2014.01) |
| *H04N 19/159* | (2014.01) |
| *H04N 19/176* | (2014.01) |
| *H04N 19/186* | (2014.01) |
| *H04N 19/503* | (2014.01) |
| *H04N 19/64* | (2014.01) |
| *H04N 19/132* | (2014.01) |
| *H04N 19/52* | (2014.01) |

(Continued)

(52) U.S. Cl.
CPC ......... *H04N 19/647* (2014.11); *H04N 19/105* (2014.11); *H04N 19/132* (2014.11); *H04N 19/157* (2014.11); *H04N 19/159* (2014.11); *H04N 19/174* (2014.11); *H04N 19/176* (2014.11); *H04N 19/186* (2014.11); *H04N 19/503* (2014.11); *H04N 19/52* (2014.11); *H04N 19/593* (2014.11)

(58) Field of Classification Search
CPC .. H04N 19/105; H04N 19/132; H04N 19/157; H04N 19/159; H04N 19/174; H04N 19/176; H04N 19/186; H04N 19/503; H04N 19/52; H04N 19/593; H04N 19/647
USPC ..................................................... 375/240.24
See application file for complete search history.

(56) References Cited

U.S. PATENT DOCUMENTS 9,918,105 B2    3/2018  Pang et al.
10,326,986 B2   6/2019  Zhang et al.
(Continued)

FOREIGN PATENT DOCUMENTS

WO    2015078304 A1    6/2015

OTHER PUBLICATIONS

Xu X., et al., "Intra Block Copy in HEVC Screen Content Coding Extensions", IEEE Journal on Emerging and Selected Topics in Circuits and Systems, vol. 6, No. 4, Dec. 2016, pp. 409-419.
(Continued)

*Primary Examiner* — Christopher S Kelley
*Assistant Examiner* — Kathleen M Walsh
(74) *Attorney, Agent, or Firm* — Shumaker & Sieffert, P.A.

(57) ABSTRACT

This disclosure describes example techniques that a video coder (e.g., video encoder or video decoder) may utilize to determine a block vector for a chroma block where the partition trees for the chroma component and the luma component are different (e.g., decoupled partition trees).

28 Claims, 20 Drawing Sheets

(51) Int. Cl.
*H04N 19/174* (2014.01)
*H04N 19/593* (2014.01)

(56) References Cited

U.S. PATENT DOCUMENTS

| | | | |
|---|---|---|---|
| 10,368,107 | B2 | 7/2019 | Zhang et al. |
| 10,412,387 | B2 | 9/2019 | Pang et al. |
| 10,432,928 | B2 | 10/2019 | Li et al. |
| 2005/0053294 | A1 | 3/2005 | Mukerjee et al. |
| 2015/0195559 | A1* | 7/2015 | Chen ............... H04N 19/52 375/240.16 |
| 2015/0195562 | A1 | 7/2015 | Li et al. |
| 2015/0264396 | A1* | 9/2015 | Zhang ............ H04N 19/567 375/240.16 |
| 2016/0219298 | A1* | 7/2016 | Li ................. H04N 19/593 |
| 2016/0227245 | A1* | 8/2016 | Liu ............... H04N 19/186 |
| 2016/0360205 | A1* | 12/2016 | Chang ........... H04N 19/102 |
| 2016/0360210 | A1* | 12/2016 | Xiu .............. H04N 19/126 |
| 2017/0054996 | A1* | 2/2017 | Xu ............... H04N 19/593 |
| 2017/0289566 | A1* | 10/2017 | He ............... H04N 19/52 |
| 2018/0098089 | A1 | 4/2018 | Chen et al. |
| 2018/0270509 | A1* | 9/2018 | Chuang .......... H04N 19/96 |
| 2019/0246128 | A1* | 8/2019 | Xu ............... H04N 19/159 |
| 2019/0379914 | A1* | 12/2019 | Misra ............ H04N 19/132 |
| 2020/0045329 | A1* | 2/2020 | Hashimoto ..... H04N 19/105 |

OTHER PUBLICATIONS

Chen J., et al., "Algorithm Description of Joint Exploration Test Model 1," Joint Video Exploration Team (JVET) of ITU-T SG16 WP3 and ISO/IEC JTC1/SC29/WG11, 1nd Meeting: Geneva, CH, Oct. 19-21, 2015, JVET-A1001, 27 pp.

ITU-T H.265, "Series H: Audiovisual and Multimedia Systems, Infrastructure of audiovisual services—Coding of moving video, High efficiency video coding," The International Telecommunication Union. Dec. 2016, 664 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.263, Series H: Audiovisual and Multimedia Systems, Infrastructure of audiovisual services—Coding of moving video, Video coding for low bit rate communication, The International Telecommunication Union. Jan. 2005, 226 pp.

ITU-T H.262 (Feb. 2000), "Information Technology—Generic Coding of Moving Pictures and Associated Audio Information: Video", Series H: Audiovisual and Multimedia Systems, Infrastructure of Audiovisual Services—Coding of Moving Video, Feb. 2000, 220 pages.

ITU-T H.261, Line Transmission of Non-Telephone Signals, Video Codec for Audiovisual Services At p × 64 kbits, The International Telecommunication Union, Mar. 1993, 29 pp.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.

International Search Report and Written Opinion—PCT/US2019/017055—ISA/EPO—dated Jun. 12, 2019 (24 pp).

Partial International Search Report—PCT/US2019/017055—ISA/EPO—dated Apr. 17, 2019 (21 pp).

Joshi R., et al., "High Efficiency Video Coding (HEVC) Screen Content Coding: Draft 6", Joint Collaborative Team on Video Coding (JCT-VC) of ITU-T SG16 WP3 and ISO/IEC JTC1/SC29/WG11 23rd Meeting: San Diego, USA, Feb. 19-26, 2016, JCTVC-W1005_v4, 708 pp.

Chen J., et al., JVET-G1001-V1 "Algorithm Description of Joint Exploration Test Model 7 (JEM7)", Joint Video Exploration Team (JVET)of ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2019), 51 Pages, XP030150980, pp. i-iv, Retrieved from the Internet: URL: http://phenix.int-evry.fr/jvet/doc_end_user/documents/7_Torino/wg11/JVET-G0001-v1.zip, p. 20, Paragraph 2.3.7—p. 23, Paragraph 2.3.7.6, p. 17, Paragraph 2.3.5—p. 18, section 2.

Li B., et al., "Non-SCCE1: Unification of Intra BC and Inter Modes", 18. JCT-VC Meeting; Jun. 30, 2014-Jul. 9, 2014; Sapporo; (Joint Collaborative Team on Video Coding of ISO/IEC JTC1/SC29/WG11 and ITU-T SG.16 WP3); URL: http://wftp3.itu.int/av-arch/jctvc-site/,, No. JCTVC-R0100_v2, Jun. 29, 2014 (Jun. 29, 2014), XP030116357, pp. 1-28.

An J., et al., "Block partitioning structure for next generation video coding", MPEG doc. m37524 and ITU-T SG16 Doc. COM16-C966-E, Oct. 2015, pp. 1-7.

Lin, et al., "Enhanced Template Matching in FRUC Mode," Joint Video Exploration Team (JVET) of ITU-T SG 16 WP 3 and ISO/IEC JTC 1/SC 29/WG 11, No. JVET-E0035, Jan. 12-20, 2017, 5th Meeting; Geneva, CH, Jan. 2, 2017, 4 pp.

Bross B., et al., "Versatile Video Coding (Draft 1)", Joint Video Experts Team (JVET) of ITU-T SG 16 WP 3 and ISO/IEC JTC 1/SC 29/WG 11, 10th Meeting, Apr. 2018, JVET-J1001-v2, 43 pages.

Chen J., et al., "Algorithm description for Versatile Video Coding and Test Model 1 (VTM 1)", Joint Video Exploration Team (JVET) of ITU-T SG 16 WP 3 and ISO/IEC JTC 1/SC 29/WG 11, 10th Meeting: San Diego, US, Apr. 10-20, 2018, Jun. 16, 2018, JVET-J1002-v2, 10 pages, XP030198635, http://phenix.int-evry.fr/jvet/doc_end_user/documents/10_SanDiego/wg11/JVET-J1002-v2.zip.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

Ergen S., "ZigBee/IEEE 802.15.4 Summary", Sep. 10, 2004, 37 pp.

U.S. Appl. No. 16/188,774, filed Nov. 13, 2018.

U.S. Appl. No. 62/586,117, filed Nov. 14, 2017.

International Preliminary Report on Patentability—PCT/US2019/017055—dated Aug. 20, 2020 (16 pp).

\* cited by examiner (a) Luma QTBT structure (b) Chroma QTBT structure

INTRA BLOCK COPY FOR VIDEO CODING

This application claims the benefit of U.S. Provisional Application No. 62/628,101, filed Feb. 8, 2018, the entire contents of which are incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for intra block copy (IBC) coding. The example techniques may be applied to existing video codecs, such as High Efficiency Video Coding (HEVC), or may be an efficient video coding tool for future video coding standards. The example techniques may relate to utilizing IBC with various motion related tools, as well as using IBC in decoupled partition trees.

For example, in IBC, a block is coded (e.g., encoded or decoded) with a block vector that points to a reference block in the same picture as the block being coded. In cases, where luma components and chroma components are partitioned in the same manner (e.g., there is coupling of partition trees), the luma block and corresponding chroma blocks can use the block vector with potential block vector scaling for the chroma blocks. However, in cases where the chroma components are partitioned differently than the luma components (e.g., there is decoupling of partition trees), there may be technical problems in video coding because the chroma blocks are shaped differently than the luma blocks, resulting in poor correspondence between chroma blocks and luma blocks.

This disclosure describes example techniques that a video coder (e.g., video encoder or video decoder) may utilize to determine a block vector for a chroma block where the partition trees for the chroma component and the luma component are different (e.g., decoupled partition trees). For instance, the video coder may further partition the chroma block, into a plurality of sub-blocks, based on the partition tree used for partitioning the luma component. In this example, there may be a one-to-one correspondence between each of the sub-blocks of the chroma block and a luma block of the plurality of luma blocks.

The video coder may determine block vectors for one or more of the sub-blocks of the chroma block based on block vectors of one or more of the plurality of luma blocks that are predicted in IBC mode. In this manner, although there is partition tree decoupling between luma and chroma components, the example techniques allow for ways in which a chroma block can inherit block vectors from a luma block. By allowing for block vectors of luma blocks to be inherited by chroma blocks, the example techniques may reduce signaling bandwidth that would otherwise be needed if block vectors for the chroma blocks needed to be explicitly signaled.

In one example, the disclosure describes a method of coding video data, the method comprising determining a plurality of blocks of a first color component that correspond to a block of a second color component, wherein the plurality of blocks of the first color component are generated from partitioning of samples of the first color component according to a first partition tree, and the block of the second color component is generated from partitioning of samples of the second color component according to a second partition tree, partitioning the block of the second color component based on the first partition tree to generate sub-blocks of the second color component that each correspond to a block of the plurality of blocks of the first color component, determining one or more block vectors for one or more of the sub-blocks of the second color component that are predicted in intra-block copy (IBC) prediction mode based on one or more block vectors of one or more corresponding blocks of the plurality of blocks of the first color component, and coding the block of the second color component based on the one or more determined block vectors.

In one example, the disclosure describes a device for coding video data, the device comprising a memory configured to store samples of a first color component and samples of a second color component of the video data and a video coder comprising at least one of programmable and fixed-function circuitry. The video coder is configured to determine a plurality of blocks of a first color component that correspond to a block of a second color component, wherein the plurality of blocks of the first color component are generated from partitioning of samples of the first color component according to a first partition tree, and the block of the second color component is generated from partitioning of samples of the second color component according to a second partition tree, partition the block of the second color component based on the first partition tree to generate sub-blocks of the second color component that each correspond to a block of the plurality of blocks of the first color component, determine one or more block vectors for one or more of the sub-blocks of the second color component that are predicted in intra-block copy (IBC) prediction mode based on one or more block vectors of one or more corresponding blocks of the plurality of blocks of the first color component, and code the block of the second color component based on the one or more determined block vectors.

In one example, the disclosure describes a computer-readable storage medium storing instructions that when executed cause one or more processors to determine a plurality of blocks of a first color component that correspond to a block of a second color component, wherein the plurality of blocks of the first color component are generated from partitioning of samples of the first color component according to a first partition tree, and the block of the second color component is generated from partitioning of samples of the second color component according to a second partition tree, partition the block of the second color component based on the first partition tree to generate sub-blocks of the second color component that each correspond to a block of the plurality of blocks of the first color component, determine one or more block vectors for one or more of the sub-blocks of the second color component that are predicted in intra-block copy (IBC) prediction mode based on one or more block vectors of one or more corresponding blocks of the plurality of blocks of the first color component, and code the block of the second color component based on the one or more determined block vectors.

In one example, the disclosure describes a device for coding video data, the device comprising means for determining a plurality of blocks of a first color component that correspond to a block of a second color component, wherein the plurality of blocks of the first color component are generated from partitioning of samples of the first color component according to a first partition tree, and the block of the second color component is generated from partitioning of samples of the second color component according to a second partition tree, means for partitioning the block of the second color component based on the first partition tree to generate sub-blocks of the second color component that each correspond to a block of the plurality of blocks of the first color component, means for determining one or more block vectors for one or more of the sub-blocks of the second color component that are predicted in intra-block copy (IBC) prediction mode based on one or more block vectors of one or more corresponding blocks of the plurality of blocks of the first color component, and means for coding the block of the second color component based on the one or more determined block vectors.

The details of one or more examples are set forth in the accompanying drawings and the description below. Other features, objects, and advantages will be apparent from the description, drawings, and claims.

DETAILED DESCRIPTION

Figure 1:
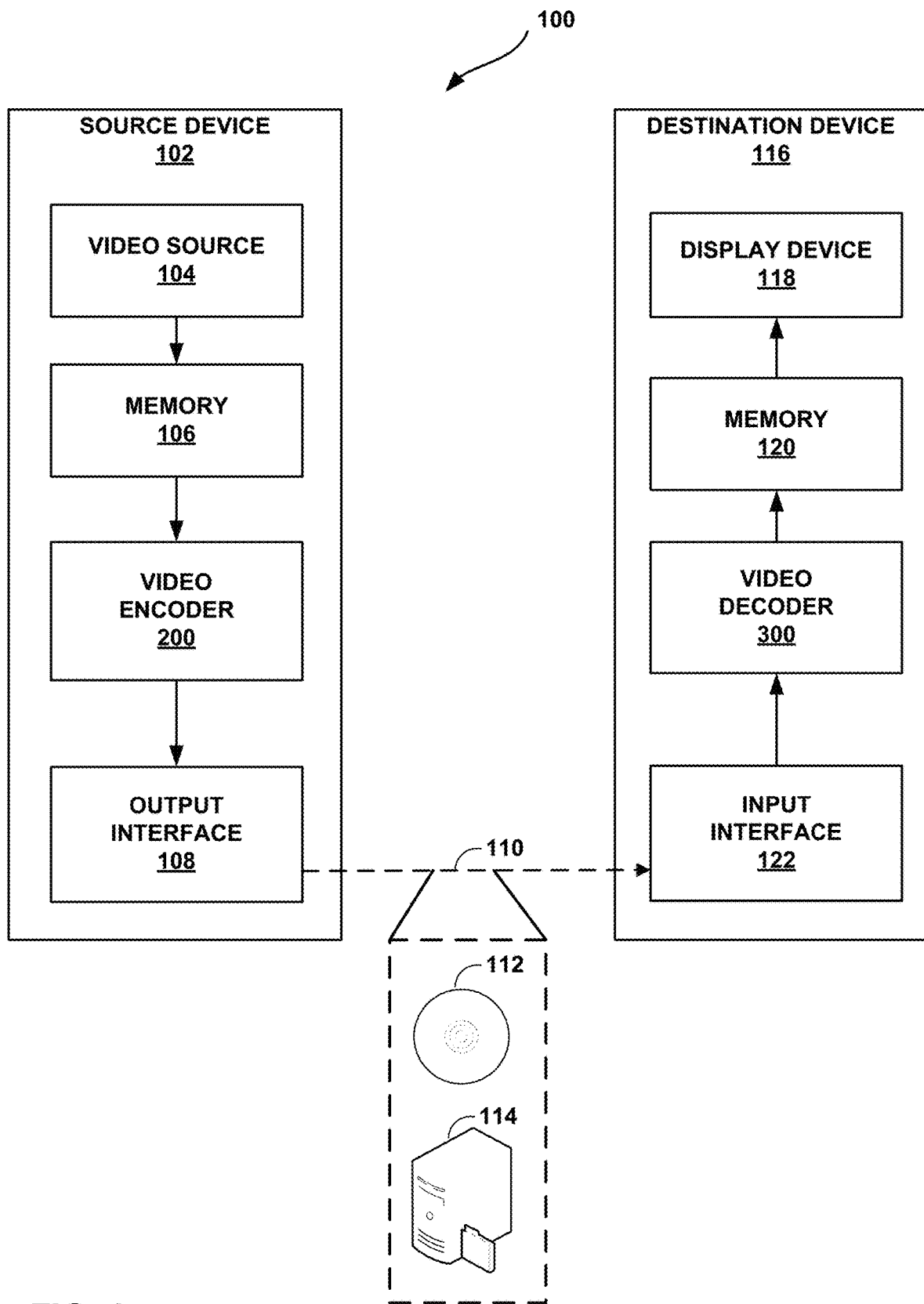
FIG. 1 is a block diagram illustrating an example video encoding and decoding system that may perform the techniques of this disclosure.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

The High-Efficiency Video Coding (HEVC) video coding standard has been promulgated by the Joint Collaboration Team on Video Coding (JCT-VC) of ITU-T Video Coding Experts Group (VCEG) and ISO/IEC Motion Picture Experts Group (MPEG). The latest HEVC specification: ITU-T H.265, Series H: Audiovisual and Multimedia Systems, Infrastructure of audiovisual services—Coding of moving video, Advanced video coding for generic audiovisual services, The International Telecommunication Union. December 2016, and referred to as HEVC WD hereinafter, is available from http://phenix.int-evry.fr/jct/doc-end_user/documents/23_San %20Diego/wg11/JCTVC-W1005-v4.zip.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. The latest version of reference software, i.e., Joint Exploration Model 7 (JEM 7) could be downloaded from: https://jvet.hhi.fraunhofer.de/svn/svn_HMJEMSoftware/tags/HM-16.6-JEM-7.0/. An algorithm description of Joint Exploration Test Model 7 (JEM7) is referred to JVET-G1001.

An early draft for the new video coding standard based on JEM7, referred to as the H.266/Versatile Video Coding (VVC) standard, is available in the document JVET-J1001 "Versatile Video Coding (Draft 1)" by Benjamin Bross, and its algorithm description is available in the document JVET-J1002 "Algorithm description for Versatile Video Coding and Test Model 1 (VTM 1)" by Jianle Chen and Elena Alshina. The techniques of this disclosure, however, are not limited to any particular coding standard.

VVC provides for an intra block copy (IBC) prediction mode similar, but not identical, to the IBC prediction mode used as part of screen content coding (SCC) of HEVC. In Intra Block Copy (IBC), a block vector for a block being coded (e.g., encoded or decoded) in IBC mode points to a reference block in the same picture as the block being coded. There are different types of blocks. For example, a picture of video data includes a luma component and chroma components. The luma component is partitioned to form a plurality of luma blocks, and the chroma components are partitioned to form a plurality of chroma blocks.

In VVC, the luma components and the chroma components may be partitioned in different ways. For example, the luma components may be partitioned according to a first partition tree, and the chroma components may be partitioned according to a second partition tree. In some examples, to reduce the amount of information that is needed for coding a chroma block, it may be possible for a chroma block predicted in the IBC prediction mode to inherit the block vector information of a corresponding luma block rather than a video encoder explicitly signaling the block vector information for the chroma block. A luma block corresponds with a chroma block and vice versa if the luma block and chroma block are part of the same coding unit (CU), as one example.

However, if the luma blocks and chroma blocks are partitioned differently, then for a chroma block there may be a plurality of different luma blocks partitioned differently than the chroma block that would be corresponding blocks. Due to the different partitions of the luma blocks and chroma blocks and there being a plurality of luma blocks that correspond to a chroma block, it may be unclear from which luma block a chroma block should inherit the block vector.

In accordance with techniques described in this disclosure, a video coder (e.g., video encoder or video decoder) may be configured to partition the chroma block into a plurality of sub-blocks of the chroma block based on the way in which the luma component was partitioned. In this manner, there is a one-to-one correspondence between each sub-block of the chroma block and the plurality of luma blocks. The video coder may be configured to assign the block vector of the luma blocks that were coded in the IBC prediction mode to respective corresponding sub-blocks of the chroma block.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for intra block copy. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for intra block copy (IBC). Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 116. Similarly, destination device 116 may access encoded data from storage device 116 via input interface 122. Storage device 116 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM7) for the Versatile Video Coding (VVC) standard currently under development. The techniques of this disclosure, however, are not limited to any particular coding standard, and may be applicable to video coding standards under development.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance (luma) and chrominance (chroma) components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

In HEVC, the largest coding unit in a slice is called a coding tree block (CTB). A CTB contains a quad-tree the nodes of which are coding units. The size of a CTB can be ranges from 16×16 to 64×64 in the HEVC main profile (although technically 8×8 CTB sizes can be supported). A coding unit (CU) could be the same size of a CTB although and as small as 8×8. Each coding unit is coded with one mode. When a CU is inter coded, it may be further partitioned into two prediction units (PUs) or become just one PU when further partition does not apply. When two PUs are present in one CU, they can be half size rectangles or two rectangle sizes with ¼ or ¾ size of the CU.

When the CU is inter coded, one set of motion information is present for each PU. In addition, each PU is coded with a unique inter-prediction mode to derive the set of motion information. In HEVC, the smallest PU sizes are 8×4 and 4×8.

As another example, video encoder 200 and video decoder 300 may be configured to operate according to JEM. According to JEM, a video coder (such as video encoder 200) partitions a picture into a plurality of coding tree units (CTUs). Video encoder 200 may partition a CTU according to a tree structure, such as a quadtree-binary tree (QTBT) structure. The QTBT structure of JEM removes the concepts of multiple partition types, such as the separation between CUs, PUs, and TUs of HEVC. A QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 200 and video decoder 300 may use a single QTBT structure to represent each of the luminance and chrominance components, while in other examples, video encoder 200 and video decoder 300 may use two or more QTBT structures, such as one QTBT structure for the luminance component and another QTBT structure for both chrominance components (or two QTBT structures for respective chrominance components).

Video encoder 200 and video decoder 300 may be configured to use quadtree partitioning per HEVC, QTBT partitioning according to JEM (e.g., VVC), or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

For each block, a set of motion information can be available. A set of motion information contains motion information for forward and backward prediction directions. Here forward and backward prediction directions are two prediction directions of a bi-directional prediction mode and the terms "forward" and "backward" do not necessarily have a geometry meaning; instead they correspond to reference picture list 0 (RefPicList0) and reference picture list 1 (RefPicList1) of a current picture. When only one reference picture list is available for a picture or slice, only RefPicList0 is available and the motion information of each block of a slice is always forward.

For each prediction direction, the motion information contains a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector has a horizontal and a vertical component.

Picture order count (POC) is widely used in video coding standards to identify a display order of a picture. Although there are cases two pictures within one coded video sequence may have the same POC value, it typically does not happen within a coded video sequence. When multiple coded video sequences are present in a bitstream, pictures with a same value of POC may be closer to each other in terms of decoding order. POC values of pictures are typically used for reference picture list construction, derivation of reference picture set as in HEVC, and motion vector scaling.

JEM also provides an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. In some examples, sixty-seven intra-prediction modes are available, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

In HEVC standard, there are two inter prediction modes, named merge (skip is considered as a special case of merge) and advanced motion vector prediction (AMVP) modes respectively for a prediction unit (PU). In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

As can be seen above, a merge candidate corresponds to a full set of motion information while an AMVP candidate contains just one motion vector for a specific prediction direction and reference index. The candidates for both modes are derived similarly from the same spatial and temporal neighboring blocks.

Figure 5:
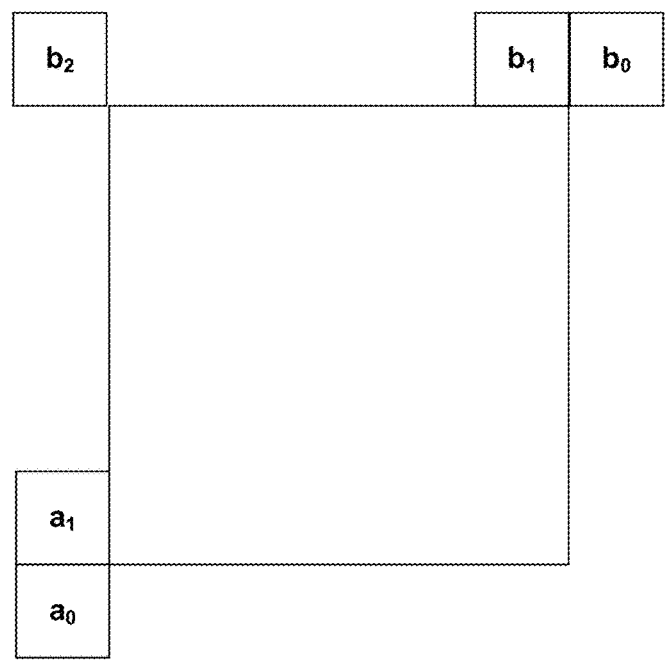
FIG. 5 is a conceptual diagram illustrating spatial neighboring motion vector (MV) candidates for merge and advanced motion vector prediction (AMVP).

For merge and AMVP, spatial MV candidates are derived from the neighboring blocks shown in FIG. 5, for a specific PU ($PU_0$), although the methods for generating the candidates from the blocks differ for merge and AMVP modes. In merge mode, the positions of five spatial MV candidates are shown in FIG. 5. For each candidate position, the availability is checked according to the order: $\{a_1, b_1, b_0, a_0, b_2\}$.

In AMVP mode, the neighboring blocks are divided into two groups: left group including the blocks $a_0$ and $a_1$, and above group including the blocks $b_0$, $b_1$, and $b_2$, as shown in FIG. 5. For the left group, the availability is checked according to the order: $\{a_0, a_1\}$. For the above group, the availability is checked according to the order: $\{b_0, b_1, b_2\}$. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate; thus the temporal distance differences can be compensated.

There are other candidates besides spatial neighboring candidates for merge and AMVP mode. In merge mode, after validating the spatial candidates, two kinds of redundancy are removed. If the candidate position for the current PU would refer to the first PU within the same CU, the position is excluded, as the same merge could be achieved by a CU without splitting into prediction partitions. Furthermore, any redundant entries where candidates have exactly the same motion information are also excluded. After the spatial neighboring candidates are checked, the temporal candidates are validated. For the temporal candidate, the right bottom position just outside of the collocated PU of the reference picture is used if it is available. Otherwise, the center position is used instead. The way to choose the collocated PU is similar to that of prior standards, but HEVC allows more flexibility by transmitting an index to specify which reference picture list is used for the collocated reference picture. One issue related to the use of the temporal candidate is the amount of the memory to store the motion information of the reference picture. This is addressed by restricting the granularity for storing the temporal motion candidates to only the resolution of a 16×16 luma grid, even when smaller PB (or possibly PU) structures are used at the corresponding location in the reference picture.

In addition, a PPS (picture parameter set)-level flag allows video encoder 200 to disable the use of the temporal candidate, which is useful for applications with error-prone transmission. The maximum number of merge candidates C is specified in the slice header. If the number of merge candidates found (including the temporal candidate) is larger than C, only the first C−1 spatial candidates and the temporal candidate are retained. Otherwise, if the number of merge candidates identified is less than C, additional candidates are generated until the number is equal to C. This simplifies the parsing and makes it more robust, as the ability to parse the coded data is not dependent on merge candidate availability. For B slices, additional merge candidates are generated by choosing two existing candidates according to a predefined order for reference picture list 0 and list 1. For example, the first generated candidate uses the first merge candidate for list 0 and the second merge candidate for list 1. HEVC specifies a total of 12 predefined pairs of two in the following order in the already constructed merge candidate list as (0, 1), (1, 0), (0, 2), (2, 0), (1, 2), (2, 1), (0, 3), (3, 0), (1, 3), (3, 1), (2, 3), and (3, 2). Among them, up to five candidates can be included after removing redundant entries. When the number of merge candidates is still less than C, default merge candidates, including default motion vectors and the corresponding reference indices, are used instead with zero motion vectors associated with reference indices from zero to the number of reference pictures minus one used to fill any remaining entries in the merge candidate list.

In AMVP mode, HEVC only allows a much lower number of candidates to be used in the motion vector prediction process case, since video encoder 200 can send a coded difference of the change in motion vector (e.g., a motion vector difference (MVD)). Furthermore, video encoder 200 may perform motion estimation, which is one of the most computationally expensive operations in video encoder 200, and complexity is reduced by allowing a small number of candidates. When the reference index of the neighboring PU is not equal to that of the current PU, a scaled version of the motion vector is used. The neighboring motion vector is scaled according to the temporal distances between the current picture and the reference pictures indicated by the reference indices of the neighboring PU and the current PU, respectively. When two spatial candidates have the same motion vector components, one redundant spatial candidate is excluded. When the number of motion vector predictors is not equal to two and the use of temporal MV prediction is not explicitly disabled, the temporal MV prediction candidate is included. This means that the temporal candidate is not used at all when two spatial candidates are available. Finally, the default motion vector which is a zero motion vector is included repeatedly until the number of motion vector prediction candidates is equal to two, which guarantees that the number of motion vector predictors is two. Thus, only a coded flag is necessary to identify which motion vector prediction is used in the case of AMVP mode.

A temporal motion vector predictor (TMVP) candidate, if enabled and available, is added into the MV candidate list after spatial motion vector candidates. The process of motion vector derivation for a TMVP candidate is the same for both merge and AMVP modes, however the target reference index for the TMVP candidate in the merge mode is always set to 0.

Figure 6A:
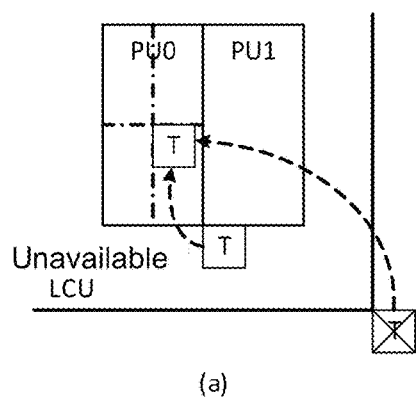
FIG. 6A is a conceptual diagram illustrating a temporal motion vector predictor (TMVP) candidate.

The primary block location for TMVP candidate derivation is the bottom right block outside of the collocated PU as shown in FIG. 6A as a block "T", to compensate the bias to the above and left blocks used to generate spatial neighboring candidates. However, if that block is located outside of the current CTB row or motion information is not available, the block is substituted with a center block of the PU.

Figure 6B:
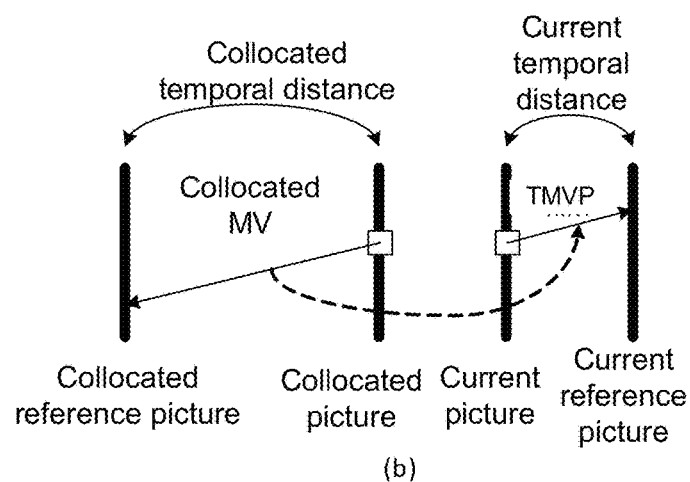
FIG. 6B is a conceptual diagram illustrating motion vector (MV) scaling for the TMVP candidate.

Motion vector for TMVP candidate is derived from the co-located PU of the co-located picture, indicated in the slice level. The motion vector for the co-located PU is called collocated MV. Similar to temporal direct mode in AVC, to derive the TMVP candidate motion vector, the co-located MV may be scaled to compensate the temporal distance differences, as shown in FIG. 6B.

Several aspects of merge and AMVP modes are worth mentioning as follows.

Motion Vector Scaling:

It is assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated, and the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Artificial Motion Vector Candidate Generation:

If a motion vector candidate list is not complete, artificial motion vector candidates are generated and inserted at the end of the list until the list will have all candidates.

In merge mode, there are two types of artificial MV candidates: combined candidate derived only for B-slices and zero candidates used only for AMVP if the first type does not provide enough artificial candidates.

For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

Pruning Process for Candidate Insertion:

Candidates from different blocks may happen to be the same, which decreases the efficiency of a merge/AMVP candidate list. A pruning process is applied to solve this problem. It compares one candidate against the others in the current candidate list to avoid inserting identical candidate in certain extent. To reduce the complexity, only limited numbers of pruning process are applied instead of comparing each potential one with all the other existing ones.

Parallel Processing of Merge/Level in HEVC:

In HEVC, a LCU may be divided into parallel motion estimation regions (MERs) and allow only those neighboring PUs which belong to different MERs from the current PU to be included in the merge/skip MVP list construction process. The size of the MER is signaled in picture parameter set as log 2_parallel_merge_level_minus2. When MER size is larger than N×N, wherein 2N×2N is the smallest CU size, MER takes effect in a way that a spatial neighboring block, if it is inside the same MER as the current PU, it is considered as unavailable.

The motion vector used for chroma coding may be scaled from the motion vector used for luma. The motion vector is derived for the luma component of a current PU/CU. Before it is used for chroma motion compensation, the motion vector is scaled, based on the chroma sampling format.

Figure 7:
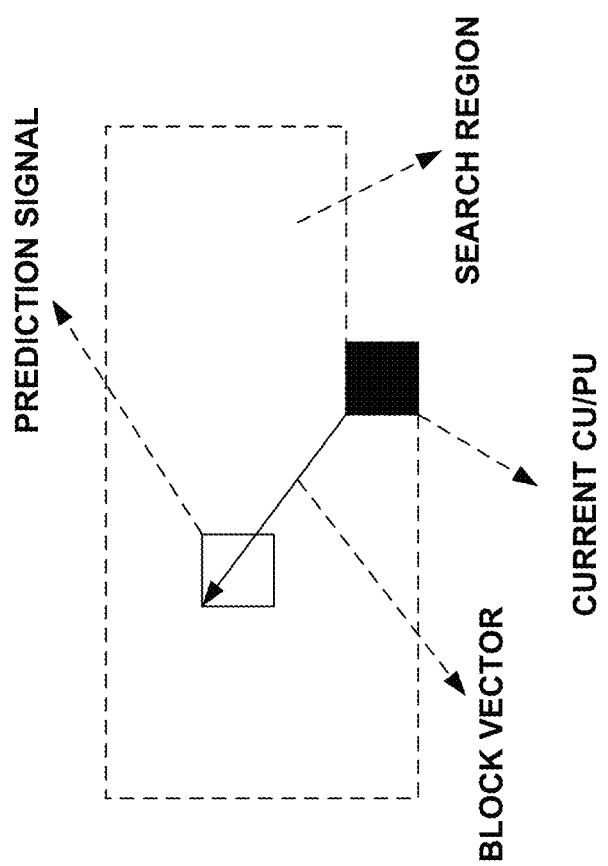
FIG. 7 is a conceptual diagram illustrating an example of intra block copy (IBC) coding.

In addition to intra-prediction or inter-prediction of a block, another coding mode includes intra block copy (IBC) prediction mode and is included in the screen content coding (SCC) extension of HEVC. In IBC prediction mode, a current CU/PU is predicted from an already decoded block of the current picture/slice referred to by a block vector of the current CU/PU, as shown in FIG. 7. Note that prediction signal is reconstructed but without in-loop filtering, including de-blocking and Sample Adaptive Offset (SAO).

In inter-prediction, a current CU/PU is predicted from an already decoded block, but in a different picture, but in intra block copy, the already decoded block and the current block are in the same picture. In intra-prediction, a current CU/PU is predicted from samples in the current picture/slice, but is not referred to by a block vector like in intra block copy. In some examples, intra block copy may be considered as a form of inter-prediction, where the current picture is included in the reference picture list.

For block compensation in intra block copy (BC), for the luma component or the chroma components that are coded with Intra BC, the block compensation is done with integer block compensation, therefore no interpolation is needed. Also, the block vector is predicted and signaled in integer level. In current screen content coding (SCC), the block vector predictor is set to (−w, 0) at the beginning of each CTB, where w is the width of the CU. Such a block vector predictor is updated to be the one of the latest coded CU/PU if that is coded with Intra BC mode. If a CU/PU is not coded with Intra BC, the block vector predictor keeps (e.g., stays) unchanged. After block vector prediction, the block vector difference is encoded using the MV difference (MVD) coding method is HEVC. The current Intra BC is enabled at both CU and PU level. For PU level intra BC, 2N×N and N×2N PU partition is supported for all the CU sizes. In addition, when the CU is the smallest CU, N×N PU partition is supported.

The following describes ways in which intra BC is treated similar to inter-prediction. In U.S. Patent Publication No. 2015/0271487, the current picture is used as a reference picture and added into the reference list. Then, Intra BC is treated like Inter mode. In Li B et al, "Non-SCCE1: Unification of intra BC and inter modes", 18. JCT-VC MEETING; 30 Jun. 2014-Sep. 7, 2014; SAPPORO; (JOINT COLLABORATIVE TEAM ON VIDEO CODING OF ISO/IEC JTC1/SC29/WG11 AND ITU-T SG.16); URL: HTTP://WFTP3.ITU.INT/AV-ARCH/JCTVC-SITE/, no. JCTVC-R0100-v2, 29 Jun. 2014 (2014-06-29), XP030116357 (hereinafter, "JCTV-R0100"), the unification of Intra BC and Inter is described. The current picture is added into the reference list. It is marked as long-term before the decoding, and marked to short-term after the decoding of current picture. When Intra BC is enabled, the syntax parsing process and decoding process of P slice is followed for I slice.

In U.S. Patent Publication No. 2016/0057420, some solutions are proposed to solve the problems regarding temporal motion vector prediction (TMVP) derivation, interaction with constrained intra prediction, reference list construction, and so on. In U.S. Patent Publication No. 2016/0100189, when Intra BC is treated like Inter mode, some solutions are proposed to avoid extra condition checking and solve the problems that exist for the interaction between TMVP, constrained intra prediction, Intra BC MV precision, and so on.

In the final HEVC SCC, information of which can be found in "Intra Block Copy in HEVC Screen Content Extensions," IEEE Journal on Emerging and Selected Topics in Circuits and Systems (volume 6, issue 4) December 2016 by Xiaozhong Xu, Shan Liu, Tzu-Der Chuang, Yu-Wen Huang, Shaw-Min Lei, Krishnakanth Rapaka, Chao Pang, Vadim Seregin, Ye-Kui Wang, and Marta Karczewicz, when the IBC mode is enabled at picture level, the current reconstructed picture is also a reference picture for decoding the current slice. To avoid possible motion vector scaling for temporal motion vector prediction, this reference picture is marked as "used for long-term reference" during the decoding of the current picture. This reference picture is put in the reference picture list (RPL) of list 0, and also in list 1 for B slices. It is placed in the last position of the initial RPL, after the long-term reference pictures (when applicable). The variable NumPicTotalCurr is increased by 1 accordingly, when the current reconstructed picture is added into the initial RPL.

Following prediction, such as intra-prediction, inter-prediction, or IBC prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

As described above, in some examples, luma components and chroma components may be partitioned in different ways. For example, a video coder (e.g., video encoder 200 or video decoder 300) may be configured to partition samples of a first color component (e.g., luma component) according to a first partition tree, and partition samples of a second color component (e.g., chroma component) according to a second partition tree. The result of the partitioning may be multiple luma blocks and corresponding chroma blocks. A chroma block and a luma block are corresponding blocks if the chroma block and the luma block belong to the same CU. For instance, as described above, video data is represented in Y, Cb, Cr format. A CU is a block of the picture, and a CU, includes a luma block and its corresponding chroma blocks that together represent the color in the picture for the block.

In some examples, the chroma components are subsampled relative to the luma components. For example, in 4:2:2 subsampling, 8×8 samples of the luma component correspond to 4×4 samples of each of the chroma components. Due to the sub sampling, each chroma block may correspond to a plurality of luma blocks. For example, assume that the 8×8 samples of luma component are divided into four 4×4 luma blocks and the 4×4 samples of a chroma component form one 4×4 chroma block. In this example, the four luma blocks correspond to the one chroma block.

For IBC prediction mode, to reduce the amount of information that video encoder 200 may need to signal to video decoder 300, rather than signaling information indicative of the block vector for a chroma block, it may be possible for the chroma block to inherit the block vector of its corresponding luma block, with some scaling to address the subsampling. In examples where luma components and chroma components are partitioned in the same way, some technical problems associated with inheriting block vectors may be minimized because the chroma blocks and luma blocks are similarly sized and shaped (e.g., both are square 4×4 sized blocks).

However, in examples where luma components and chroma components are partitioned in different ways, there may be technical problems to video coding. For instance, due to the different partitioning schemes for luma and chroma components, a chroma block may correspond with a plurality of luma blocks, where two or more of the luma blocks are sized and shaped differently than the chroma block. In such examples, it may be unknown from which luma block or luma blocks the chroma block is to inherit block vector information.

In one or more examples, the video coder may be configured to determine a plurality of blocks of the first color component (e.g., luma component) that correspond to a block of the second color component (e.g., chroma block). The video coder may be configured to partition the block of the second color component based on the first partition tree (e.g., based on the manner in which the first color component is partitioned) to generate sub-blocks of the block of the second color component. In this example, because the chroma block is partitioned based on the first partition tree, there may be one corresponding luma block to each chroma sub-block. For instance, the plurality of luma blocks together correspond with the chroma block. After partitioning the chroma block into sub-blocks, each of the sub-blocks corresponds to one of the plurality of luma blocks.

The video coder may determine one or more block vectors for the one or more sub-blocks of the block of the second color component based on one or more block vectors of the plurality of blocks of the first color component that are predicted in the IBC prediction mode. For example, of the plurality of luma blocks, a subset of these luma blocks may be predicted in IBC prediction mode. Each luma block in the subset corresponds to a sub-block of the chroma block, and the sub-blocks of the chroma block may inherit the block vector of the luma block from the subset to which the sub-block corresponds.

In this way, for a chroma block that is predicted in IBC mode and where different partition trees are used to partition luma and chroma components, video encoder 200 may not need to signal information to video decoder 300 indicative of the block vector for the chroma block. Rather, video encoder 200 and video decoder 300 may partition the chroma block into sub-blocks in a manner similar to the partitioning used for the luma component so that there is one-to-one correspondence between the luma blocks and the sub-blocks of the chroma block. In some examples, not all of the luma blocks may be predicted in IBC prediction mode, and in such examples, video encoder 200 and video decoder 300 may assign the block vectors of the luma blocks that are predicted in IBC prediction mode to their respective corresponding sub-blocks of the chroma block as a way for the sub-blocks of the chroma block to inherit block vectors from luma blocks.

In addition to assigning block vectors to the sub-blocks of the chroma block based on the block vectors of the plurality of luma blocks, video encoder 200 and video decoder 300 may need to scale the block vectors based on the subsampling format. For instance, if 4:2:2 subsampling format is used, then video encoder 200 and video decoder 300 may divide both the x- and y-component of the block vectors by two.

In the above examples, the chroma sub-blocks are described as inheriting block vectors from luma blocks. In some examples, the opposite may occur. For example, video encoder 200 or video decoder 300 may determine a block vector for a chroma block and then partition samples of a luma component based on the manner in which the samples of the chroma component were partitioned. Video encoder 200 and video decoder 300 may then assign block vectors to the luma blocks generated from the partition. For ease of description, the example techniques are described with respect to chroma sub-blocks inheriting (with potential scaling) block vectors from respective corresponding luma blocks. In some examples, the corresponding luma blocks may be shaped in the same manner (e.g., horizontal rectangles, vertical rectangles, or squares) as the sub-blocks of the chroma block.

In addition to describing techniques for determining block vectors for sub-blocks of a chroma block to allow the sub-blocks to inherit block vectors, the disclosure describes techniques related to other issues that may be present with IBC prediction mode in VVC. These techniques may be used in combination with the techniques for sub-blocks of a chroma block inheriting block vectors or may be separate from the techniques for sub-block of a chroma block inheriting block vectors.

Figure 2A:
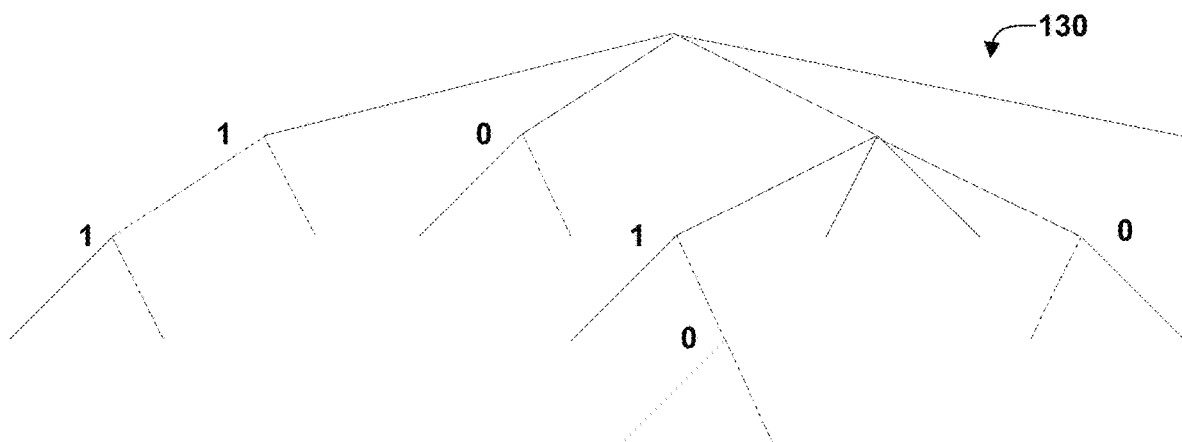
FIGS. 2A and 2B are conceptual diagrams illustrating an example quadtree binary tree (QTBT) structure, and a corresponding coding tree unit (CTU).
Figure 2B:
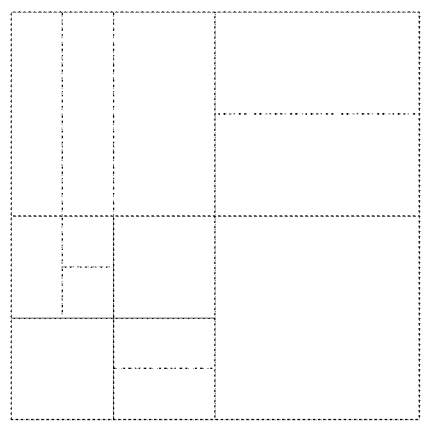

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

In VCEG proposal COM16-C966: J. An, Y.-W. Chen, K. Zhang, H. Huang, Y.-W. Huang, and S. Lei., "Block partitioning structure for next generation video coding", International Telecommunication Union, COM16-C966, September 2015, a quad-tree-binary-tree (QTBT) was described for future video coding standard beyond HEVC. Simulations showed the proposed QTBT structure is more efficient than the quad-tree structure in used HEVC.

In the QTBT structure, as described above, a CTB is firstly partitioned by quad-tree, where the quad-tree splitting of one node can be iterated until the node reaches the minimum allowed quad-tree leaf node size (MinQTSize). If the quad-tree leaf node size is not larger than the maximum allowed binary tree root node size (MaxBTSize), it can be further partitioned by a binary tree. The binary tree splitting of one node can be iterated until the node reaches the minimum allowed binary tree leaf node size (MinBTSize) or the maximum allowed binary tree depth (MaxBTDepth). The binary tree leaf node is namely CU which will be used for prediction (e.g. intra-picture or inter-picture prediction) and transform without any further partitioning.

There are two splitting types, symmetric horizontal splitting and symmetric vertical splitting, in the binary tree splitting. In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes.

The quad-tree leaf nodes may have a size from 16×16 (i.e., the MinQTSize) to 128×128 (i.e., the CTU size). If the leaf quad-tree node is 128×128, it will not be further split by the binary tree since the size exceeds the MaxBTSize (i.e., 64×64). Otherwise, the leaf quad-tree node will be further partitioned by the binary tree. Therefore, the quad-tree leaf node is also the root node for the binary tree and has the binary tree depth as 0. When the binary tree depth reaches MaxBTDepth (i.e., 4), it implies that there is no further splitting. When the binary tree node has width equal to MinBTSize (i.e., 4), it implies that there is no further horizontal splitting. Similarly, when the binary tree node has height equal to MinBTSize, it implies no further vertical splitting. The leaf nodes of the binary tree are namely CUs further processed by prediction and transform without any further partitioning.

FIG. 2B illustrates an example of block partitioning by using QTBT, and FIG. 2A illustrates the corresponding tree structure. The solid lines indicate quad-tree splitting and dotted lines indicate binary tree splitting. In each splitting (i.e., non-leaf) node of the binary tree, one flag is signaled to indicate which splitting type (i.e., horizontal or vertical) is used, where 0 indicates horizontal splitting and 1 indicates vertical splitting. For the quad-tree splitting, there is no need to indicate the splitting type since it always splits a block horizontally and vertically into 4 sub-blocks with an equal size.

In addition, the QTBT block structure supports the feature that luma and chroma have the separate QTBT structure. Currently, for P and B slice the luma and chroma CTUs in one CTU share the same QTBT structure. For I slice, the luma CTU is partitioned into CUs by a QTBT structure (e.g., first partition tree), and chroma CTU are partitioned into chroma CUs by another QTBT structure (e.g. second, different partition tree). This means that a CU in an I slice includes a coding block of luma component or coding blocks of two chroma component, and a CU in P and B slice a CU includes coding blocks of all three color components.

Figure 8:
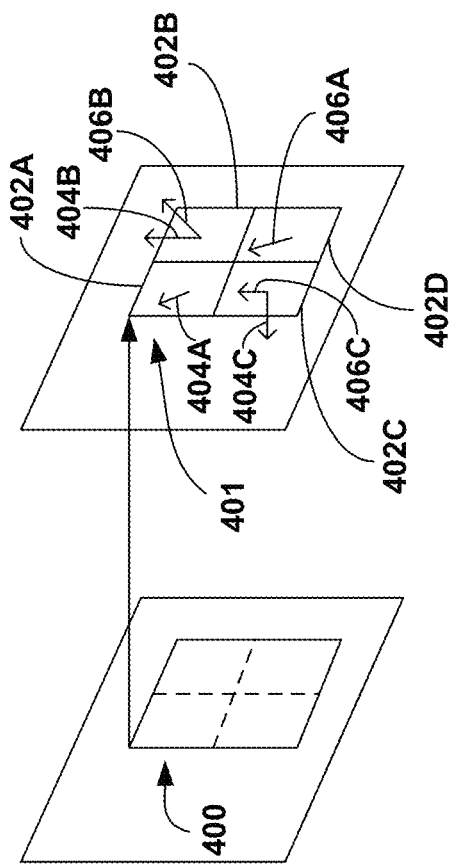
FIG. 8 is a conceptual diagram illustrating an example of alternative temporal motion vector prediction (ATMVP) for a coding unit (CU).

The following describes sub-block motion vector candidates, as illustrated in FIG. 8. In the JEM with QTBT, each CU can have at most one set of motion parameters for each prediction direction. Two sub-CU level motion vector prediction methods are considered in video encoder 200 by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector. To preserve more accurate motion field for sub-CU motion prediction, the motion compression for the reference frames is currently disabled.

For instance, in FIG. 8, block 400 refers to the block for which ATMVP is to be performed, and is illustrated as being split into N×N sub-PUs. Block 400 is co-located with block 401 in a motion source picture. Block 401 is divided into corresponding blocks for the split blocks of block 400. Block 401 includes split blocks 402A-402D. Block 402D may be a representative center block in ATMVP. Each of blocks 402A-402D may include one motion vector (e.g., MV0 that is a motion vector that points to a block of a picture in a first reference picture list, or MV1 that is a motion vector that points to a block of in a second reference picture list) or two motion vectors (e.g., MV0 and MV1). In FIG. 8, motion vectors 404A, 404B, and 404C are all motion vectors that point to blocks in pictures in a first reference picture list (e.g., are all MV0s), and motion vectors 406A, 406B, and 406C are all motion vectors that point to blocks in pictures in a second reference picture list (e.g., are all MV1s).

For adaptive motion vector resolution, sub-pixel motion compensation is normally much more efficient than integer-pixel motion compensation. However, for some content, such as texture with very high frequency or screen content, sub-pixel motion compensation shows no better or even worse performance. In such cases, it is better to only have MVs with integer-pixel precision. In U.S. Patent Publication No. 2015/0195562, MV precision information (either integer-pel or quarter-pel) is proposed to be signaled for a block. In U.S. application Ser. No. 15/724,044, filed Oct. 3, 2017 (published as U.S. Patent Publication No. 2018/0098089, it is proposed to allow more MV precisions, such as 4-pel or 8-pel.

For decoder-side motion vector derivation (DMVD) in JEM, in JEM reference software, there are several inter coding tools which derive or refine the motion vector (MV) for a current block at the decoder side (at video decoder 300). These decoder-side MV derivation (DMVD) approaches are described in more detail further below.

Pattern matched motion vector derivation (PMMVD) mode is a special merge mode based on Frame-Rate Up Conversion (FRUC) techniques. With the PMMVD mode, motion information of a block is not signaled but is derived at the decoder side. This technology was included in JEM.

In the PMMVD mode, a FRUC flag is signalled for a CU when its merge flag is true. When the FRUC flag is false, a merge index is signalled, and the regular merge mode is used. When the FRUC flag is true, an additional FRUC mode flag is signalled to indicate which method (bilateral matching or template matching) is to be used to derive motion information for the block.

During the motion derivation process, an initial motion vector is first derived for the whole CU based on bilateral matching or template matching. First, the merge list of the CU, or called PMMVD seeds, is checked and the candidate which leads to the minimum matching cost is selected as the starting point. Then a local search based on bilateral matching or template matching around the starting point is performed and the MV results in the minimum matching cost is taken as the MV for the whole CU. Subsequently, the motion information is further refined at a sub-block level with the derived CU motion vectors as the starting points.

Figure 9:
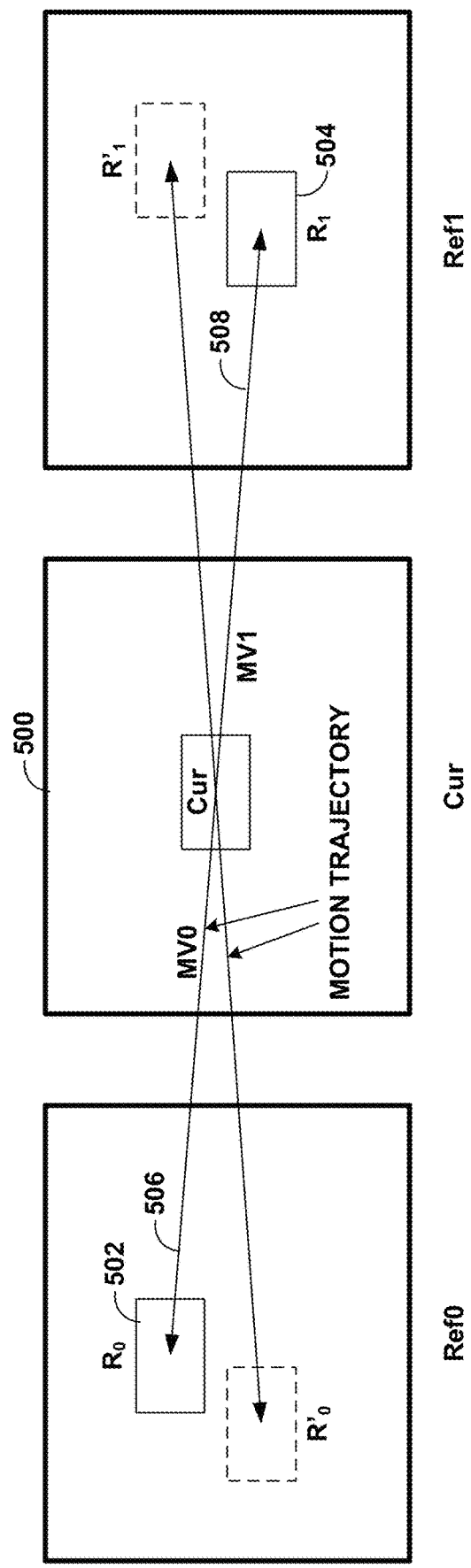
FIG. 9 is a conceptual diagram illustrating an example of frame-rate up conversion (FRUC) bilateral matching.

As shown in FIG. 9, the bilateral matching is used to derive motion information of the current block by finding the best match between two reference blocks along the motion trajectory of the current block in two different reference pictures. Under the assumption of continuous motion trajectory, the motion vectors MV0 506 and MV1 508 for the current block in current picture 500 pointing to the two reference blocks (e.g., MV0 points to reference block R0 502 and MV1 508 points to reference block R1 504) may be proportional to the temporal distances between the current picture and the two reference pictures. As a special case, when the current picture is temporally between the two reference pictures and the temporal distance from the current picture to the two reference pictures is the same, the bilateral matching becomes mirror based bi-directional MV.

Figure 10:
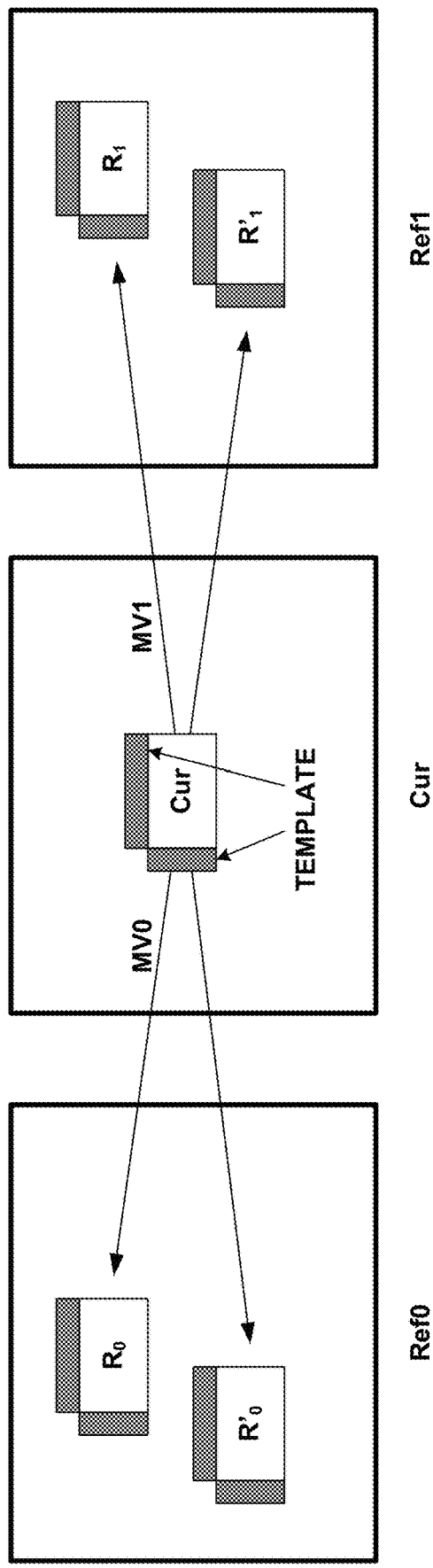
FIG. 10 is a conceptual diagram illustrating an example of FRUC template matching.

As shown in FIG. 10, template matching is used to derive motion information of the current block by finding the best match between a template (top and/or left neighbouring blocks of the current block) in the current picture and a block (same size to the template) in a reference picture.

At the encoder side (e.g., video encoder 200), the decision on whether using FRUC merge mode for a CU is based on RD (rate-distortion) cost selection as done for a normal merge candidate. That is, the two matching modes (bilateral matching and template matching) are both checked for a CU by using RD cost selection. The one leading to the minimal cost is further compared to other CU modes. If a FRUC matching mode is the most efficient one, a FRUC flag is set to true for the CU and the related matching mode is used.

Figures 11A, 11B:
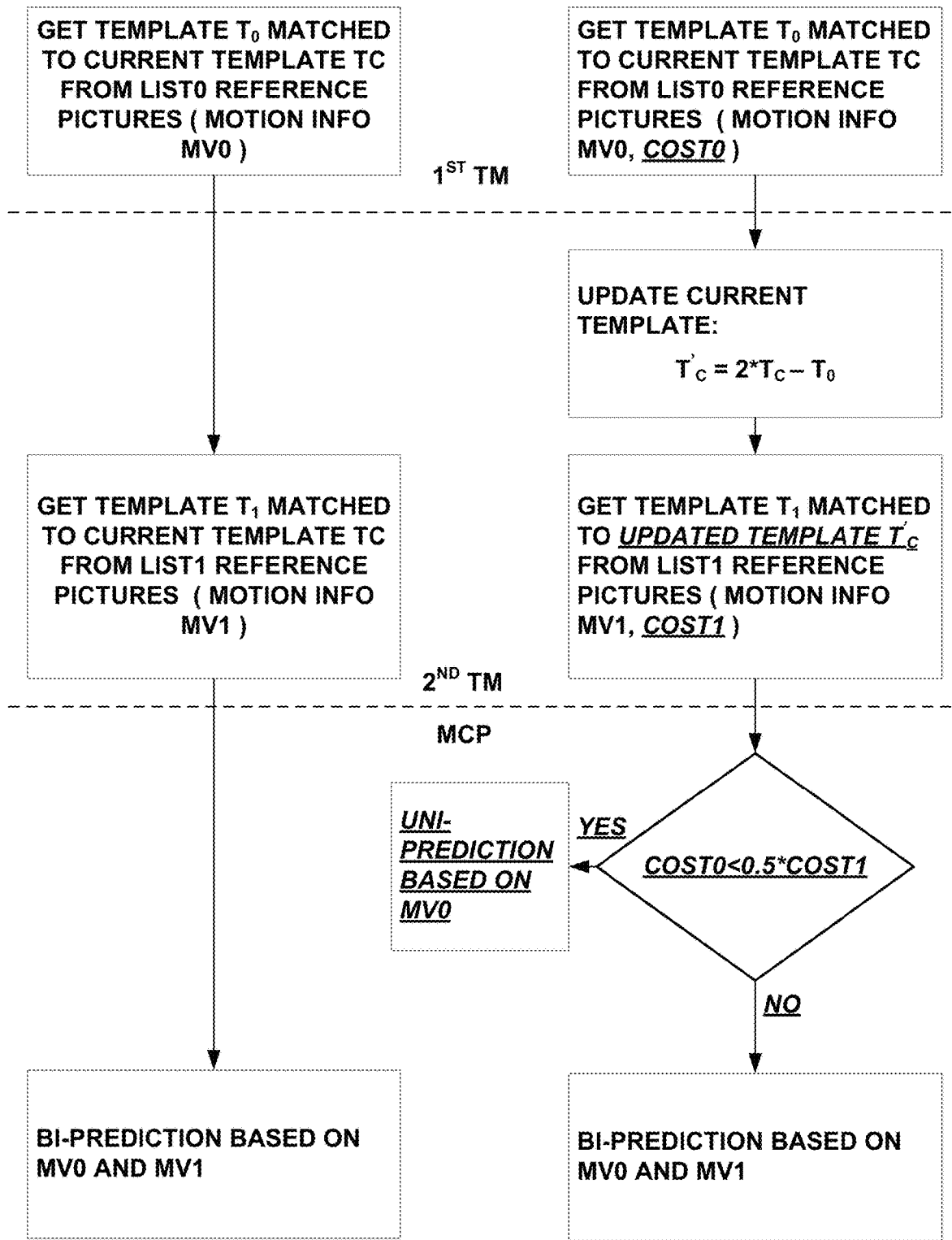
FIGS. 11A and 11B are flowcharts illustrating examples of FRUC template matching mode.

In the 5$^{th}$ WET meeting, WET-E0035 described further techniques for FRUC template matching. A flowchart of the existing FRUC template matching mode is shown in FIG. 11A. In the first step, a template $T_0$ (and its corresponding motion information MV0) is found to match current template Tc of current block from list0 reference pictures. In the second step, template $T_1$ (and its corresponding motion information MV1) is found from list1 reference pictures.

The obtained motion information MV0 and MV1 are used to perform bi-prediction to generate a predictor of the current block.

The existing FRUC template matching mode may be enhanced by introducing bi-directional template matching and adaptive selection between uni-prediction and bi-prediction. The modifications are highlighted with italics and underlining in FIG. 11B compared to FIG. 11A.

The bi-directional template matching is implemented based on the existing uni-directional template matching. As shown in FIG. 11B, a matched template $T_0$ is firstly found in the first step of template matching from list0 reference pictures (note that list0 here is only taken as an example). In fact, whether list0 or list1 is used in the first step is adaptive to initial distortion cost between the current template and the initial template in the corresponding reference picture. The initial template can be determined with initial motion information of the current block, which is available before performing the 1$^{st}$ template matching. The reference picture list corresponding to minimal initial template distortion cost will be used in the first step of template matching. For example, if the initial template distortion cost corresponding to list0 is no larger than the cost corresponding to list1, list0 is used in the first step of template matching and list1 is used in the second step, then the current template Tc of the current block is updated as follows: $T'_C=2*T_C-T_0$.

The updated current template $T'_C$ instead of the current template $T_C$ is utilized to find another matched template $T_1$ from list1 reference pictures in the second template matching. As a result, the matched template $T_1$ is founded by jointly using list0 and list1 reference pictures. This matching process is called bi-directional template matching.

The proposed selection between uni-prediction and bi-prediction for motion compensation prediction (MCP) is based on template matching distortion. As shown in FIG. 11B, during template matching, distortion between template $T_0$ and Tc (the current template) can be calculated as cost0, and distortion between template $T_1$ and $T'_C$ (the updated current template) can be calculated as cost1. If cost0 is less than 0.5*cost1, uni-prediction based on MV0 is applied to FRUC template matching mode; otherwise, bi-prediction based on MV0 and MV1 is applied. Noted that cost0 is compared to 0.5*cost1 since cost1 indicates a difference between template $T_1$ and $T'_C$ (the updated current template), which is 2 times the difference between Tc (the current template) and its prediction of $0.5*(T_0+T_1)$. It is noted that the proposed methods may only be applied to PU-level motion refinement. Sub-PU level motion refinement keeps unchanged.

Figure 12:
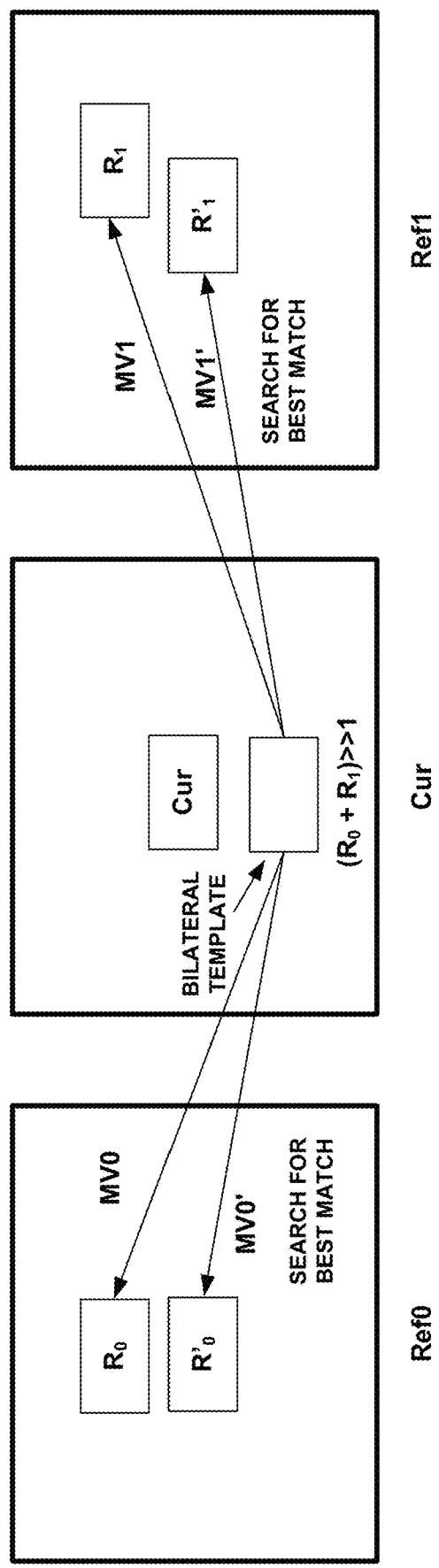
FIG. 12 is a conceptual diagram illustrating a decoder-side motion vector derivation (DMVD) based on bilateral template matching.

The following describes the bilateral template matching. A bilateral template is generated as the weighted combination of the two prediction blocks, from the initial MV0 of list0 and MV1 of list1, respectively, as shown in FIG. 12. The template matching operation includes calculating cost measures between the generated template and the sample region (around the initial prediction block) in the reference picture. For each of the two reference pictures, the MV that yields the minimum template cost is considered as the updated MV of that list to replace the original one. Finally, the two new MVs, i.e., MV0' and MV1', as shown in FIG. 12, are used for regular bi-prediction. As it is commonly used in block-matching motion estimation, the sum of absolute differences (SAD) is utilized as cost measure. The proposed decoder-side motion vector derivation (DMVD) is applied for merge mode of bi-prediction with one from the reference picture in the past and the other from the reference picture in the future, without the transmission of an additional syntax element. In JEM4.0, when LIC, affine, ATMVP or STMVP merge candidate or FRUC is selected for one CU, the DMVD is not applied.

The following describes bi-direction optical flow in JEM. Bi-directional Optical flow (BIO) is pixel-wise motion refinement which is performed on top of block-wise motion compensation in a case of bi-prediction. Since it compensates, the fine motion may be inside the block enabling BIO results in enlarging block size for motion compensation. Sample-level motion refinement does not require exhaustive search or signaling since there is an explicit equation which gives fine motion vector for each sample. For ease of explanation, the example is described with respect to FIG. 13.

Let $I^{(k)}$ be luminance value from reference k (k=0, 1) after compensation block motion, and $\partial I^{(k)}/\partial x$, $\partial I^{(k)}/\partial y$ are horizontal and vertical components of the $I^{(k)}$ gradient, respectively. Assuming the optical flow is valid, the motion vector field ($v_x$, $v_y$), shown in FIG. 13, is given by an equation $$\partial I^{(k)}/\partial t + v_x \partial I(k)/\partial x + v_y \partial I^{(k)}/\partial y = 0. \quad (1)$$

Combining optical flow equation with Hermite interpolation for motion trajectory of each sample one gets a unique polynomial of third order which matches both function values $I^{(k)}$ and derivatives $\partial I^{(k)}/\partial x$, $\partial I^{(k)}/\partial y$ at the ends. The value of this polynomial at t=0 is BIO prediction $$pred_{BIO} = 1/2 \cdot (I^{(0)} + I^{(1)} + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)). \quad (2)$$

Figure 13:
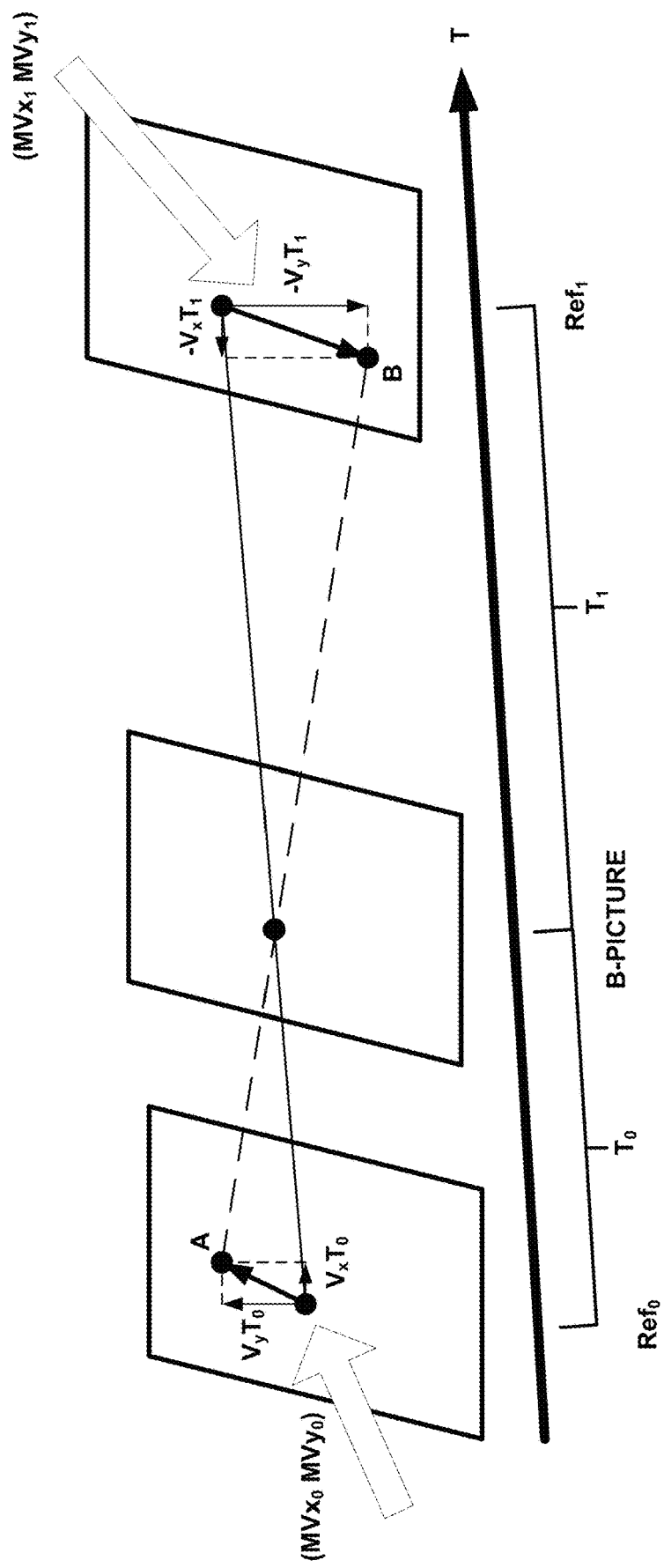
FIG. 13 is a conceptual diagram illustrating optical flow trajectory.

Here $\tau_0$ ($T_0$ in FIG. 13) and $\tau_1$ ($T_1$ in FIG. 13) denote the distance to reference frames as shown in FIG. 13. Distances $\tau_0$ and $\tau_1$ are calculated based on picture order count (POC) value for Ref0 and Ref1: $\tau_0$=POC(current)−POC(Ref0), $\tau_1$=POC(Ref1)−POC(current). If both predictions come from the same time direction (both from the past or both from the future) then signs are different $\tau_0 \cdot \tau_1 < 0$. In this case, BIO is applied only if prediction comes not from the same time moment ($\tau_0 \neq \tau_1$), both referenced regions have non-zero motion (MVx$_0$, MVy$_0$, MVx$_1$, MVy$_1 \neq 0$) and block motion vectors are proportional to the time distance (MVx$_0$/MVx$_1$=MVy$_0$/MVy$_1$=−$\tau_0$/$\tau_1$).

The motion vector field ($v_x$, $v_y$) is determined by minimizing the difference Δ between values in points A and B (intersection of motion trajectory and reference frame planes on FIG. 13). Model uses only first linear term of local Taylor expansion for Δ:

$$\Delta = (I^{(0)} - I^{(1)}{}_0 + v_x(\tau_1 \partial I^{(1)}/\partial x + \tau_0 \partial I^{(0)}/\partial X) + v_y(\tau_1 \partial I^{(1)}/\partial y + \tau_0 \partial I^{(0)}/\partial y)) \quad (3)$$

All values in (1) depend on sample location (i', j'), which was omitted so far. Assuming the motion is consistent in local surrounding, we minimize Δ inside (2M+1)×(2M+1) square window Ω centered in currently predicted point (i,j):

$$(v_x, v_y) = \underset{v_x, v_y}{\operatorname{argmin}} \sum_{[i',j'] \in \Omega} \Delta^2[i', j'] \quad (4)$$

For this optimization problem we use a simplified solution making first minimization in vertical and then in horizontal directions. It results in $$v_x = (s_1 + r) > m\,?\,clip3\left(-thBIO, thBIO, -\frac{s_3}{(s_1 + r)}\right) : 0 \quad (5)$$

$$v_y = (s_5 + r) > m\,?\,clip3\left(-thBIO, thBIO, -\frac{s_6 - v_x s_2/2}{(s_5 + r)}\right) : 0 \quad (6)$$

where, $$s_1 = \sum_{[i',j'] \in \Omega} (\tau_1 \partial I^{(1)}/\partial x + \tau_0 \partial I^{(0)}/\partial x)^2; \quad (7)$$

$$s_3 = \sum_{[i',j'] \in \Omega} (I^{(1)} - I^{(0)})(\tau_1 \partial I^{(1)}/\partial x + \tau_0 \partial I^{(0)}/\partial x);$$

$$s_2 = \sum_{[i',j'] \in \Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_5 = \sum_{[i',j'] \in \Omega} (\tau_1 \partial I^{(1)}/\partial y + \tau_0 \partial I^{(0)}/\partial y)^2;$$

$$s_6 = \sum_{[i',j'] \in \Omega} (I^{(1)} - I^{(0)})(\tau_1 \partial I^{(1)}/\partial y + \tau_0 \partial I^{(0)}/\partial y)$$

In order to avoid division by zero or very small values, regularization parameters r and m are introduced in equations (2), (3).

$$r = 500 \cdot 4^{d-8} \quad (8)$$

$$m = 700 \cdot 4^{d-8} \quad (9)$$

Here d is the internal bit-depth of the input video.

In some cases, MV regiment of BIO might be unreliable due to noise or irregular motion. Therefore, in BIO, the magnitude of MV regiment is clipped to a certain threshold thBIO. The threshold value is determined based on whether all the reference pictures of the current picture are all from one direction. If all the reference pictures of the current pictures of the current picture are from one direction, the value of the threshold is set to $12 \times 2^{14-d}$; otherwise, it is set to $12 \times 2^{13-d}$.

Gradients for BIO are calculated at the same time with motion compensation interpolation using operations consistent with HEVC motion compensation process (2D separable FIR). The input for this 2D separable FIR is the same reference frame sample as for motion compensation process and fractional position (fracX, fracY) according to the fractional part of block motion vector. In case that the horizontal gradient $\partial I/\partial x$ signal first interpolated vertically using BIOfilterS corresponding to the fractional position fracY with de-scaling shift d-8, then gradient filter BIOfilterG is applied in the horizontal direction corresponding to the fractional position fracX with de-scaling shift by 18-d. In case that the vertical gradient $\partial I/\partial y$ first gradient filter is applied vertically using BIOfilterG corresponding to the fractional position fracY with de-scaling shift d-8, then signal displacement is performed using BIOfilterS in the horizontal direction corresponding to the fractional position fracX with de-scaling shift by 18-d. The length of interpolation filter for gradients calculation BIOfilterG and signal displacement BIOfilterF is shorter (6-tap) in order to maintain reasonable complexity. Table 1 shows the filters used for gradients calculation for different fractional positions of block motion vector in BIO. Table 2 shows the interpolation filters used for prediction signal generation in BIO.

Figure 14:
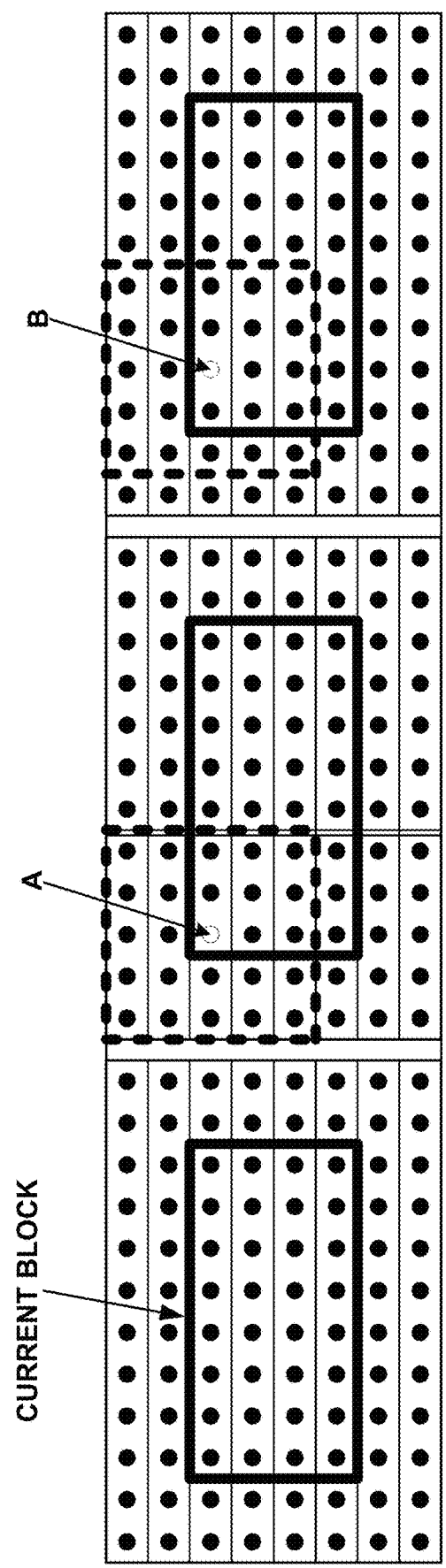
FIG. 14 is a conceptual diagram for bi-directional optical (BIO) for 8×4 block.

FIG. 14 shows an example of the gradient calculation for an 8×4 block. For an 8×4 block, a coder (e.g., video encoder 200 or video decoder 300) needs to fetch the motion compensated predictors and calculate the HOR/VER gradients of all the pixels within the current block as well as the outer two lines of pixels because solving vx and vy for each pixel needs the HOR/VER gradient values and motion compensated predictors of the pixels within the window Ω centered in each pixel as shown in equation (4). In JEM, the size of this window is set to 5×5. The coder therefore needs to fetch the motion compensated predictors and calculate the gradients for the outer two lines of pixels.

TABLE 1

Filters for gradients calculation in BIO

| Fractional pel position | Interpolation filter for gradient (BIOfilterG) |
|---|---|
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {1, 4, −57, 57, −4, 1} |

TABLE 2

Interpolation filters for prediction signal generation in BIO

| Fractional pel position | Interpolation filter for prediction signal (BIOfilterS) |
|---|---|
| 0 | {0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |
| 3/8 | {3, −11, 50, 29, −9, 2} |
| 7/16 | {3, −11, 44, 35, −10, 3} |
| 1/2 | {1, −7, 38, 38, −7, 1} |

In JEM, BIO is applied to all bi-directional predicted blocks when the two predictions are from different reference pictures. When LIC (local illumination compensation) is enabled for a CU, BIO is disabled.

Figure 15A:
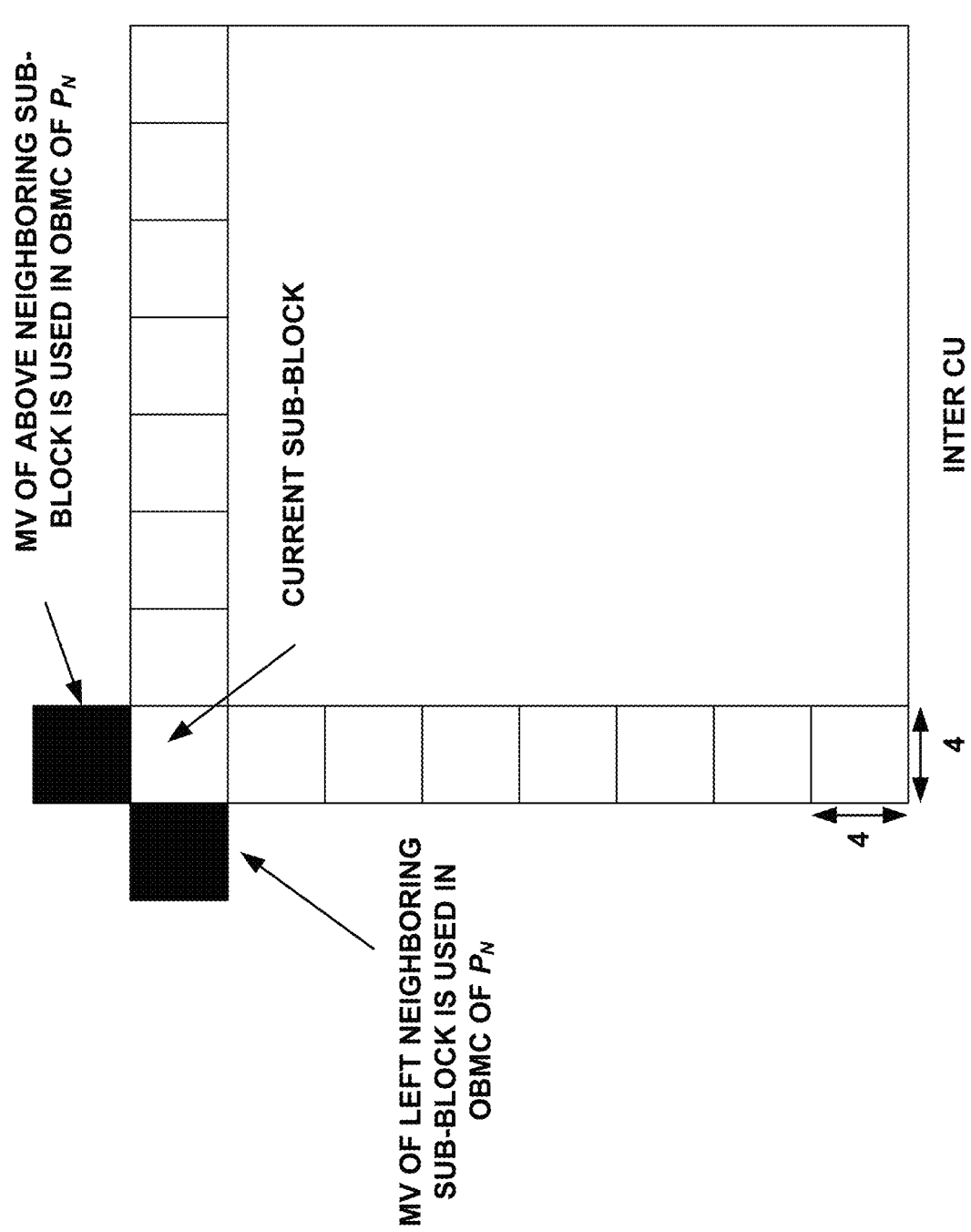
FIGS. 15A and 15B are conceptual diagrams illustrating sub-blocks where overlapped block motion compensation (OBMC) applies.
Figure 15B:
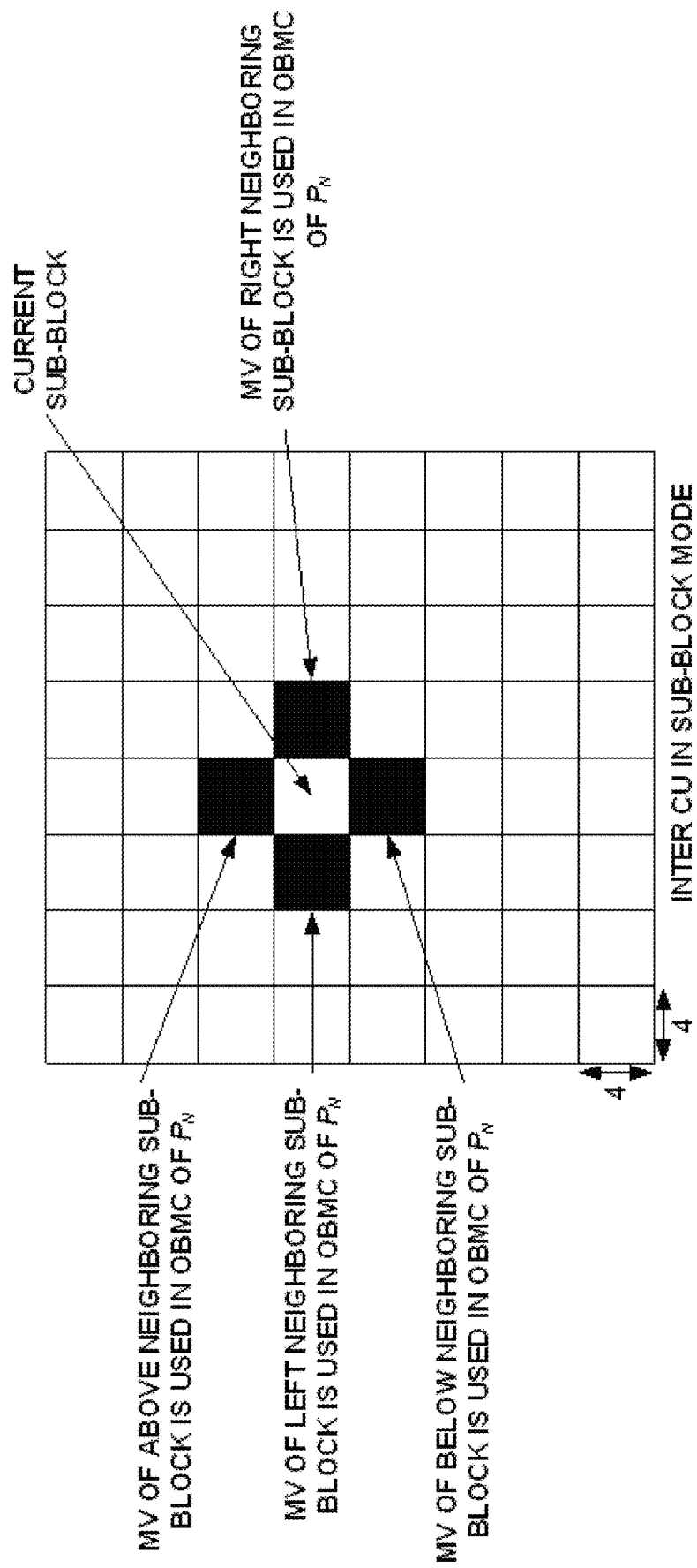
Figure 16A:
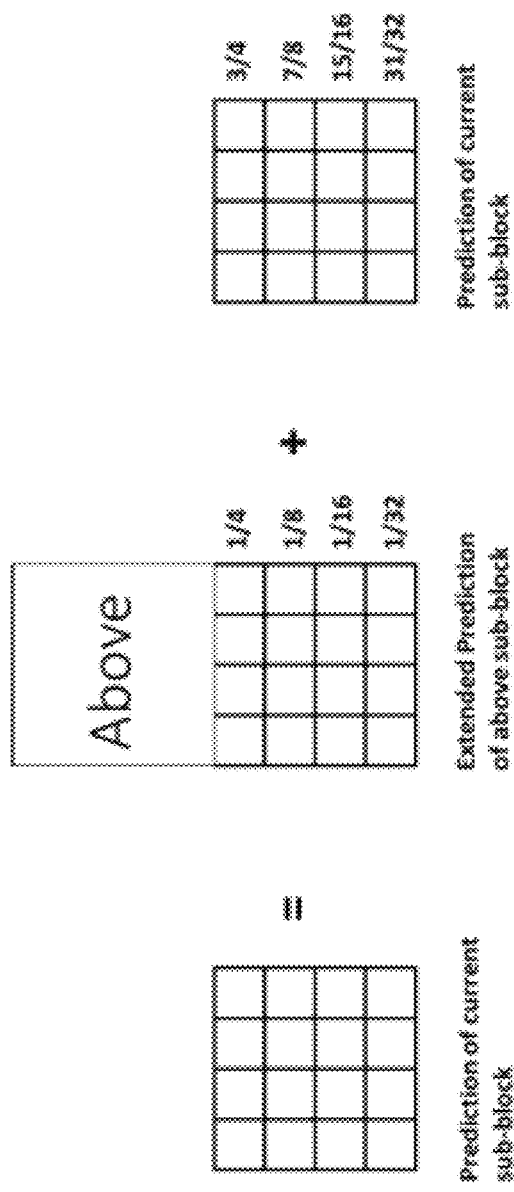
FIGS. 16A-16D illustrate examples of OBMC weighting.
Figure 16B:
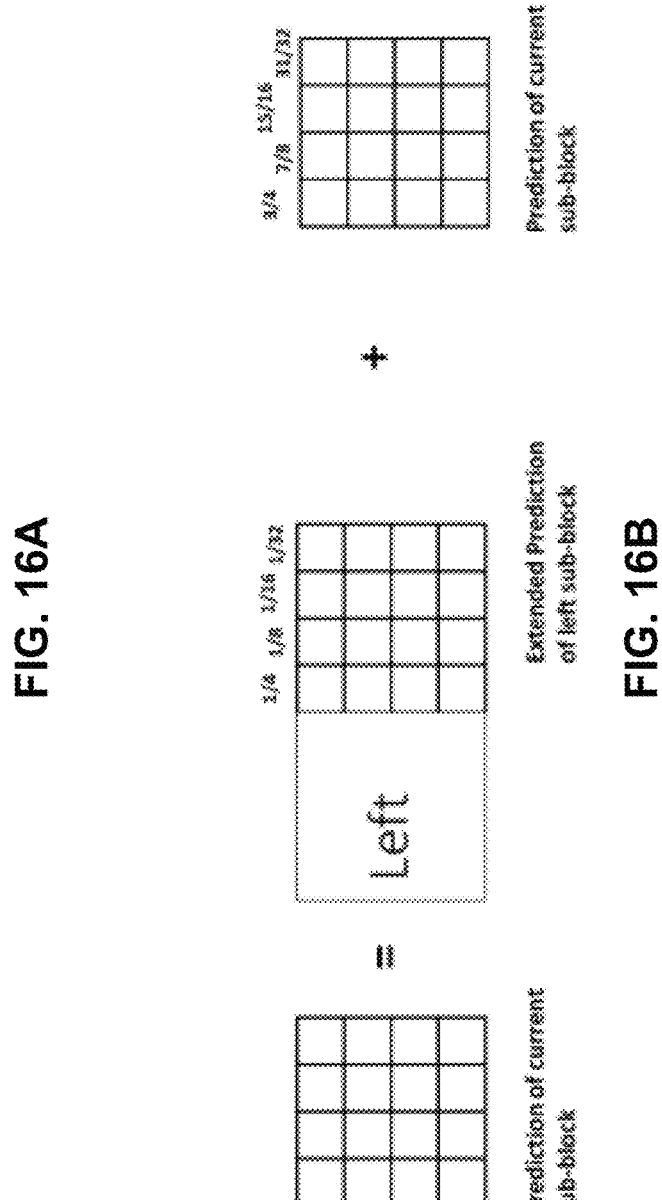
Figure 16C:
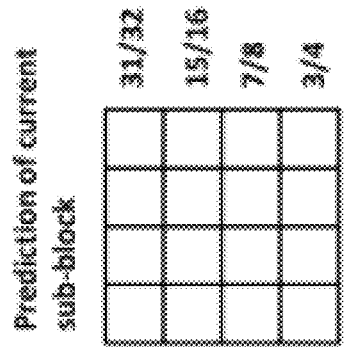
Figure 16C:
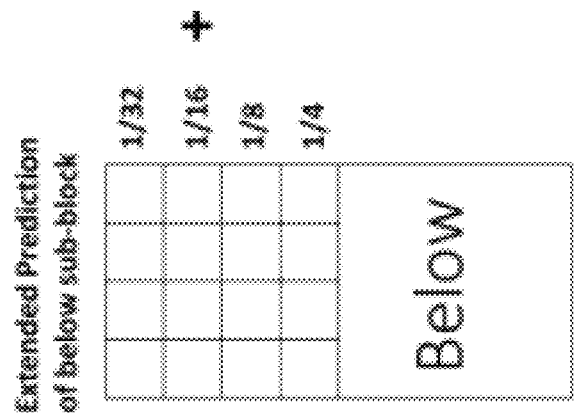
Figure 16C:
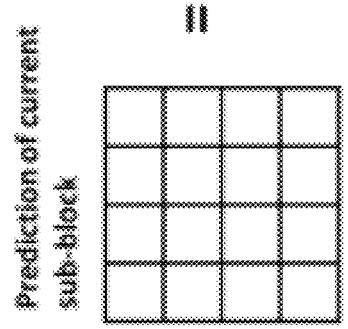
Figure 16D:
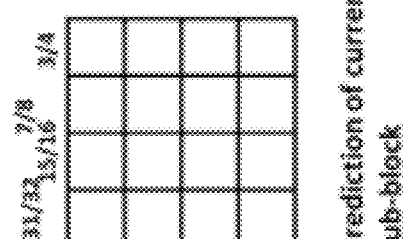
Figure 16D:
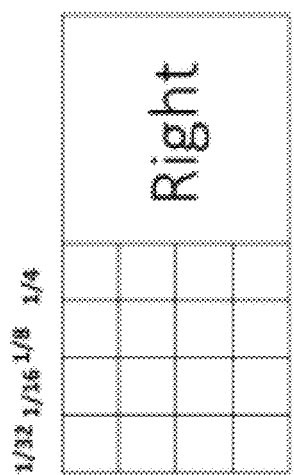
Figure 16D:
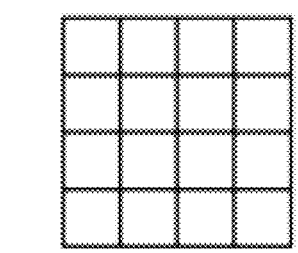

The following describes overlapped block motion compensation (OBMC) in JEM. The Overlapped Block Motion Compensation (OBMC) has been used for early generations of video standards, e.g., as in H.263. In JEM, the OBMC is performed for all Motion Compensated (MC) block boundaries except the right and bottom boundaries of a CU. Moreover, it is applied for both luma and chroma components. In JEM, a MC block is corresponding to a coding block. When a CU is coded with sub-CU mode (includes sub-CU merge, Affine and FRUC mode, described above), each sub-block of the CU is a MC block. To process CU boundaries in a uniform fashion, OBMC is performed at sub-block level for all MC block boundaries, where sub-block size is set equal to 4×4, as illustrated in FIGS. 15A and 15B.

When OBMC applies to the current sub-block, besides current motion vectors, motion vectors of four connected neighbouring sub-blocks, if available and not identical to the current motion vector, are also used to derive prediction block for the current sub-block. These multiple prediction blocks based on multiple motion vectors are combined to generate the final prediction signal of the current sub-block.

As shown in FIGS. 16A-16D, a prediction block based on motion vectors of a neighbouring sub-block is denoted as $P_N$, with N indicating an index for the neighbouring above, below, left and right sub-blocks and a prediction block based on motion vectors of the current sub-block is denoted as $P_C$. When $P_N$ is based on the motion information of a neighbouring sub-block that contains the same motion information to the current sub-block, the OBMC is not performed from $P_N$. Otherwise, every pixel of $P_N$ is added to the same pixel in $P_C$, i.e., four rows/columns of $P_N$ are added to $P_C$. The weighting factors {1/4, 1/8, 1/16, 1/32} are used for $P_N$ and the weighting factors {3/4, 7/8, 15/16, 31/32} are used for $P_C$. The exceptions are small MC blocks, (i.e., when height or width of the coding block is equal to 4 or a CU is coded with sub-CU mode), for which only two rows/columns of $P_N$ are added to $P_C$. In this case, weighting factors {1/4, 1/8} are used for $P_N$ and weighting factors {3/4, 7/8} are used for $P_C$. For $P_N$ generated based on motion vectors of vertically (horizontally) neighbouring sub-block, pixels in the same row (column) of $P_N$ are added to $P_C$ with a same weighting factor. It is noted that BIO is also applied for the derivation of the prediction block Pn.

In JEM, for a CU with size less than or equal to 256 luma samples, a CU level flag is signalled to indicate whether OBMC is applied or not for the current CU. For the CUs with size larger than 256 luma samples or not coded with AMVP mode, OBMC is applied by default. At video encoder 200, when OBMC is applied for a CU, its impact is taken into account during the motion estimation stage. The prediction signal by using motion information of the top neighboring block and the left neighboring block is used to compensate the top and left boundaries of the original signal of the current CU, and then the normal motion estimation process is applied.

There may be some technical problems with all of the new coding tools in JEM such as when used with IBC. Addressing these technical problems with technical solutions that are for IBC operation may result in better video encoding and decoding, such as where operation of video encoder 200 and video decoder 300 may be made better. As one example, the IBC in HEVC SCC is utilized for one luma block and two corresponding chroma blocks together with the same motion vector (with potential scaling for chroma components). How to indicate/signal the motion vectors for IBC under the decoupled partition trees is a technical problem related to video coding, and particularly to IBC video coding. As another example, several new motion related tools have been studied. How to combine them with IBC is a technical problem related to video coding, and particularly to IBC video coding.

The following describes examples of technical solutions to the technical problems. These solutions may be used together, separately, or in any combination thereof.

When the partition tree is decoupled for different color components, the signaling of IBC mode and/or motion vectors of IBC for a block may only applied to one color component (e.g., luma component). Alternatively, furthermore, the block of a component (e.g., Cb or Cr) which is coded after a pre-coded component (e.g., Luma) always inherits the usage of IBC mode of a corresponding block of that pre-coded component.

In one example, the DM (derived) mode flag or index as described in U.S. patent application Ser. No. 15/676,314 (U.S. Patent Publication No. 2018/0048889) and Ser. No. 15/676,345 (U.S. Patent Publication No. 2018-0063553) may be utilized. If the corresponding luma block identified by the DM flag or index is coded with IBC, then the current chroma block is set to be coded with IBC. In one example, the "corresponding" block refers to any predefined mapping. For example, the corresponding block is the 4×4 block at the center of the current block, such as C3 in FIG. 17A. Alternatively, blocks located in other positions (e.g., C0, C1, C2, BR, BL, TL, TR), as shown in FIG. 17A, may be utilized.

When inherited IBC mode is enabled for a block, the motion information of the current whole block may be inherited or derived from one corresponding block of the corresponding pre-coded component (such as the luma component) region, or derived from default motion vectors.

When inherited IBC mode is enabled for a block, the motion information of sub-blocks within the current whole block may be inherited or derived from multiple corresponding blocks within the region of the pre-coded component, or derived from default motion vectors. For example, as described in greater detail below, suppose the pre-coded component is the luma component, the Cb block indicated as the shaded block 706 in FIG. 17B may inherit motion and mode information from the corresponding luma partitions. If the corresponding luma block (e.g., partition covering TL and the partition covering C2) is coded with IBC, the associated motion vectors may be further scaled accordingly. An example is depicted in FIGS. 18A and 18B.

Figures 17A, 17B:
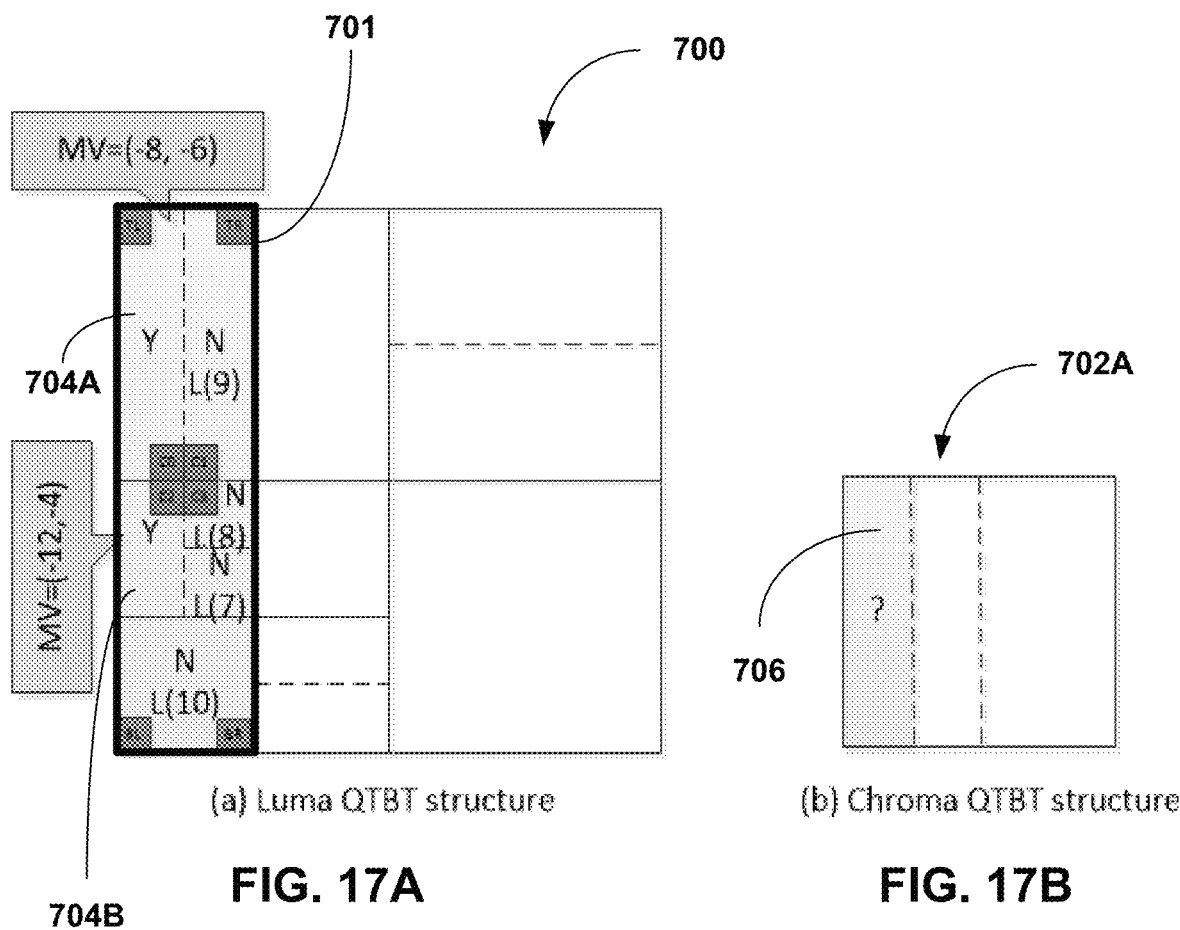
FIG. 17A is an example of a CTU partition structure for a luma QTBT structure.
FIG. 17B is an example of a CTU partition structure for a chroma QTBT structure.
Figures 18A, 18B:
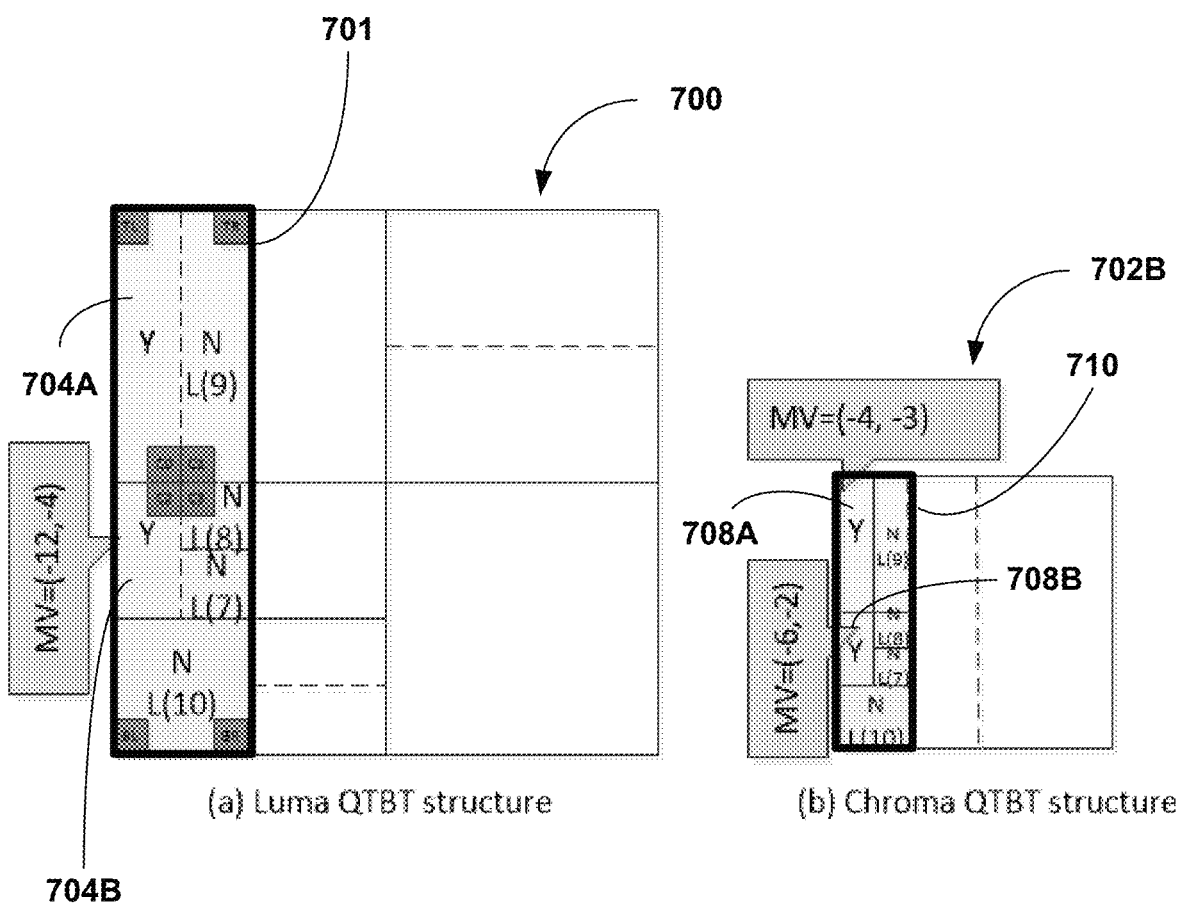
FIGS. 18A and 18B illustrate an example of sub-block partition and mode inheritance for luma QTBT structure and chroma QTBT structure.

For example, FIG. 17A illustrates luma samples 700 of a luma component that are partitioned according to a luma QTBT structure, which is similar to the partition tree illustrated in FIG. 2A. For instance, the partitioning of luma samples 700 in FIG. 17A is the same as the partitioning illustrated in FIG. 2B. The partitioning of luma samples 700 based on a first partition tree generates luma partition 701 (shown in bolded box) that includes a plurality of blocks including luma block 704A and luma block 704B as two examples. Luma block 704A may be predicted in IBC prediction mode and has a block vector of <−8, −6>, and luma block 704B may be predicted in IBC prediction mode and has a block vector of <−12, −4>.

FIG. 17B illustrates chroma samples 702A of a chroma component that are partitioned according to a chroma QTBT structure. Chroma samples 702A and luma samples 700 correspond with one another and are part of the same CU. In the illustrated example, chroma samples 702A are partitioned based on a second partition tree that is different than the first partition tree used to partition luma samples 700. Partitioning chroma samples 702A according to the second partition tree results in chroma block 706.

In the example of FIGS. 17A and 17B, chroma block 706 corresponds to luma partition 701. However, luma partition 701 includes two blocks predicted using IBC prediction mode: block 704A and block 704B. Therefore, it may be unclear which block vector (e.g., block vector of block 704A or block vector of block 704B) chroma block 706 should inherit.

FIG. 18A is a reproduction of FIG. 17A. In accordance with the techniques described in this disclosure, and as illustrated in FIG. 18B, video encoder 200 and video decoder 300 may partition chroma block 706 based on the partition tree used for luma samples 700, as illustrated with chroma samples 702B of a chroma component. For instance, chroma block 706 of FIG. 17B is chroma partition 710 in FIG. 18B, where chroma partition 710 is partitioned in the same manner as luma partition 701.

Video encoder 200 and video decoder 300 may partition chroma block 706 to generate sub-blocks 708A and 708B. In the example illustrated in FIG. 18B, sub-block 708A corresponds with luma block 704A, and sub-block 708B corresponds with luma block 704B. For example, chroma sub-block 708A is the same shape as luma block 704A, and chroma sub-block 708A is in the same relative position within chroma partition 710 that luma block 704A is within luma partition 701. In this case, there is one-to-one correspondence between chroma sub-block 708A and luma block 704A. Also, chroma sub-block 708B is the same shape as luma block 704B, and chroma sub-block 708B is in the same relative position within chroma partition 710 that luma block 704B is within luma partition 701. In this case, there is one-to-one correspondence between chroma sub-block 708B and luma block 704B.

In one or more examples, video encoder 200 and video decoder 300 may assign chroma sub-block 708A the block vector of luma block 704A (e.g., chroma sub-block 708A inherits the block vector from luma block 704A). Video encoder 200 and video decoder 300 may assign chroma sub-block 708B the block vector of luma block 708A (e.g., chroma sub-block 708B inherits the block vector from luma block 704B). In addition, video encoder 200 and video decoder 300 may perform scaling of the block vectors. For instance, the block vector for luma block 704A is <−8, −6> and the block vector for luma block 704B is <−12, −4>. In this example, video encoder 200 and video decoder 300 may divide the x-component and the y-component by two because luma samples 700 are 4× the size of chroma samples 702A or 702B (e.g., 4:2:2 subsampling format). As illustrated, the block vector of chroma sub-block 708A is <−4, −3>, where −4 is −8 divided by 2, and −3 is −6 divided by 2. The block vector of chroma sub-block 708B is <−6, −2>, where −6 is −12 divided by, and −2 is −4 divided by 2.

In this manner, a video coder (e.g., video encoder 200 or video decoder 300) may be configured to partition samples of a first color component (e.g., luma samples 700 of a luma component) according to a first partition tree (e.g., luma QTBT structure as illustrated in FIGS. 17A and 18A), and partition samples of a second color component (e.g., chroma component) according to a second partition tree (e.g., chroma QTBT structure as illustrated in FIG. 17B). The second partition tree is different than the first partition tree, and the second color component is different than the first color component.

The video coder may determine a plurality of blocks of the first color component that correspond to a block of the second color component (e.g., blocks of partition 701 correspond to chroma block 706). The plurality of blocks of the first color component are generated from the partitioning of samples of the first color component according to the first partition tree (e.g., luma samples 700 of a luma component is partitioned to generate luma partition 701 that includes the plurality of blocks), and the block of the second color component (e.g., block 706) is generated from the partitioning of samples of the second color component according to the second partition tree.

In one or more examples described in this disclosure, the video coder may partition the block of the second color component based on the first partition tree to generate sub-blocks of the second color component that each correspond to a block of the plurality of blocks of the first color component. For example, as illustrated in FIG. 18B, chroma partition 710, which corresponds to chroma block 706, is partitioned based on the luma QTBT to generate chroma sub-blocks 708A and 708B. Chroma sub-blocks 708A and 708B each correspond to luma blocks 704A and 704B.

The video coder may determine one or more block vectors for one or more of the sub-blocks of the second color component that are predicted in intra-block copy (IBC) prediction mode based on one or more block vectors of one or more corresponding blocks of the plurality of blocks of the first color component. For example, chroma sub-blocks 708A and 708B are predicted in IBC prediction mode, and the video coder may determine the block vectors for chroma sub-blocks 708A and 708B based on the block vectors for luma block 704A and 704B.

The video coder may code the block of the second color component based on the one or more determined block vectors. For example, where coding is encoding, for chroma sub-block 708A, video encoder 200 may determine a prediction block based on the block vector of sub-block 708A, subtract the prediction block from sub-block 708A to generate a residual block, and signal information indicative of the residual block. Where coding is decoding, for chroma sub-block 708A, video decoder 300 may determine a prediction block based on the block vector of sub-block 708A, determine a residual block (e.g., based on signaled information) for sub-block 708A, and add the residual block to the prediction block to reconstruct sub-block 708 of chroma block 706.

Alternatively, for some sub-blocks (set 0), the motion information may be inherited, while for other sub-blocks (set 1), the motion information may be derived from set 0 or derived from default motion vectors. In one example, furthermore, one mode index to indicate the usage of inherited IBC mode for each or all of the remaining color component(s) is signaled. For each color component, or for luma and chroma components respectively, a flag may be signaled in SPS/VPS/PPS/Slice header/Tile header to indicate whether IBC could be enabled or disabled.

The following describes intra block copy interactions with OBMC. In one example, OBMC may be always disabled. Therefore, there is no need to signal the OBMC flag when the block is coded with IBC. Alternatively, the OBMC flag may be signaled before the indication of IBC mode (e.g., reference index pointed to the current picture; or a mode index representing IBC mode); in this case, the signaling of IBC indication is skipped.

In one example, OBMC may be also enabled, but with the restriction of the neighboring block to be coded the same coding mode. For example, if a current block is coded with IBC mode, and one of the current block's neighboring blocks exists, but the neighboring block is not coded with IBC mode, this neighboring block is set unavailable. That is, the motion parameters are not utilized in the OBMC process for the current block. For example, if the current block is coded with non-IBC mode, and one of its neighboring block is existing, but coded with IBC mode, this neighboring block is set as unavailable. That is, the motion parameters are not utilized in the OBMC process for the current block.

In one example, OBMC may be also enabled and all motion information of existing neighboring blocks may be utilized regardless the coded mode of neighboring blocks. Alternatively, furthermore, weighting factors may further depend on the coded mode of the current block. Alternatively, furthermore, weighting factors may further depend on whether the current block and neighboring block share the same coded mode.

The following describes sub-blocks with intra block copy. Sub-block IBC may be applied wherein one block is coded using the IBC mode; however, for each sub-block within the block, the motion vectors (e.g., block vectors) may be different. For example, the block vector for sub-block 708A and the block vector for sub-block 708B may be different.

In one example, a base motion vector may be signaled. The sub-block motion vector may depend on the base motion vector. In one example, the base motion vector may be signaled as the difference between the optimal motion vector minus a motion vector predictor. The motion vector predictor may be one derived from motion vectors of spatial and/or temporal neighboring blocks. In one example, the base motion vector may be a predictor for signaling the real motion vector associated with a sub-block. In one example, the base motion vector may be the motion vector associated with one of the multiple sub-blocks. Therefore, there is no need to signal the motion vector for the sub-block any more. In one example, the base motion vector may be used as a starting point and sub-block's motion vector may be derived (or refined) accordingly (e.g., using the template matching method).

In some examples, slice level indices may be signaled to indicate the precision of motion vectors for IBC coded blocks. Alternatively, the index may be signaled in block level/region level/tile/PPS/SPS/VPS. In one example, the candidates of MV precisions may include, for example, integer-pel, quad-pel, half-pel, two-pel, four-pel. In one example, the candidate set of MV precisions may depend on coded information, such as slice type, temporal layer index, motion vector range.

The following describes intra block copy interaction with affine motion. In one example, IBC mode is not signaled when the block is coded with affine mode. In one example, affine mode is not signaled when the block is coded with IBC mode. For example, the video coder may determine that a block is coded in the IBC prediction mode. The video coder may at least one of avoid signaling or parsing of information indicative of whether affine mode is enabled for the block based on the determination that the block is coded in the IBC prediction mode. For instance, video encoder 200 may not signal information indicative of whether affine mode is enabled for the block, and video decoder 300 may not parse information indicative of whether affine mode is enabled for the block.

The motion associated with IBC coded blocks may be treated as conventional translational motion. Therefore, the example techniques described in U.S. Application Ser. No. 62/586,117, filed Nov. 14, 2017, and U.S. application Ser. No. 16/188,774, filed Nov. 13, 2018 may still work. Alternately, a third motion category (in addition to existing affine and conventional translational motion) is defined. And for the merge mode, if the decoded merge index indicates the usage of IBC mode, only motion information belonging to the third category from neighboring blocks may be added to the merge candidate list.

In some examples, it may be required to disallow taking the IBC motion vector as the starting point for ATMVP derivation process. In one example, the picture where motion is fetched from cannot be the current picture. In one example, as in the current ATMVP design, the starting point for fetching motion information is from the first available spatial merging candidate. With the proposed method, the first available non-IBC motion is used as the starting point. For example, if the first available spatial merging candidate is associated with the IBC motion information and the second is associated with conventional translational motion, then the $2^{nd}$ available spatial merging candidate is used as the starting point. If one of the sub-blocks where the motion is fetched is coded with IBC mode, it may be treated as intra mode in the ATMVP process. In this case, for example, a default motion may be treated as the motion of the sub-block. Alternatively, the motion from a neighboring sub-block may be utilized as the motion of the sub-block.

As one example, a video coder may determine that a block of the first color component or the second color component is predicted using ATMVP, determine one or more blocks in a reference picture used for performing ATMVP on the block, determine that at least one block of the one or more blocks in the reference picture is predicted in the IBC prediction mode, and perform an ATMVP operation for the block without using a block vector used for the at least one block in the reference picture that is predicted in the IBC prediction mode.

The following describes intra block copy interaction with Illumination Compensation (IC). In one example, IBC mode is not signaled when the block is coded with IC mode. In one example, IC mode is not signaled when the block is coded with IBC mode For instance, the video coder may determine that a block is coded in the IBC prediction mode, and at least one of avoid signaling or parsing of information indicative of whether illumination compensation (IC) mode is enabled for the block based on the determination that the block is coded in the IBC prediction mode. For example, video encoder 200 may not signal information indicative of whether IC mode is enabled for the second block, and video decoder 300 may not parse information indicative of whether IC mode is enabled for the second block.

In one example, IC mode can be applied to a block coded with IBC. In this case, the neighboring samples of the reference block are in the same picture of the current block.

The following describes intra block copy interaction with Adaptive Motion Vector Precision. In one example, IBC mode is signaled only when the block is coded with a pre-defined subset of MV precisions, such as motion precision that is in one or multiple integer pixel scales. In one example, a subset of MV precision is signaled when the block is coded with IBC mode. In one example, MV precision is not signaled when the block is coded with IBC mode. The precision may be defined in a higher-level, such as in a slice header.

For example, the video coder may determine that a first block of the first color component or the second color component is not predicted in the IBC prediction mode and determine a first set of motion vector precisions for the first block. The video coder may determine that a second block of the first color component or the second color component is predicted in the IBC prediction mode and determine a second set of motion vector precisions for the second block. The second set of motion vector precisions is a subset of the first set of motion vector precisions.

The following describes intra block copy interaction with Bi-directional Optical Flow (BIO). In one example, BIO is not conducted if at least one of the two motion vectors refer to the current picture, i.e., at least one of the two motion vectors is a block vector in IBC. For example, the video coder may determine that a block is coded with a vector that refers to the picture that includes the block. In this example, the video coder may avoid performing BIO on the block based on the block being coded with a vector that refers to the picture that includes the block.

In another example, BIO is conducted if at least one of the two motion vectors refers to the current picture, i.e., at least one of the two motion vectors is a block vector in IBC. In this case, the POC difference of the current frame and the reference frame for IBC, which is also the current frame indeed, is equal to zero. A fixed number not equal to 0 can be used to substitute the POC difference in the BIO derivation such as Eq(3)-Eq(7).

The following describes intra block copy interaction with Frame Rate Up Conversion (FRUC). In one example, template matching cannot be conducted if the seed motion vector refers to the current picture. In one example, template matching is conducted with the reference picture identical to the current picture if the seed motion vector refers to the current picture. In one example, bi-literal matching cannot be conducted if at least one of the two motion vectors refers to the current picture, i.e., at least one of the two motion vectors is a block vector in IBC. For example, the video coder may determine that a block is coded with a vector that refers to the picture that includes the block. The video coder may avoid performing bi-literal matching on the block based on the block being coded with a vector that refers to the picture that includes the block.

Figure 3:
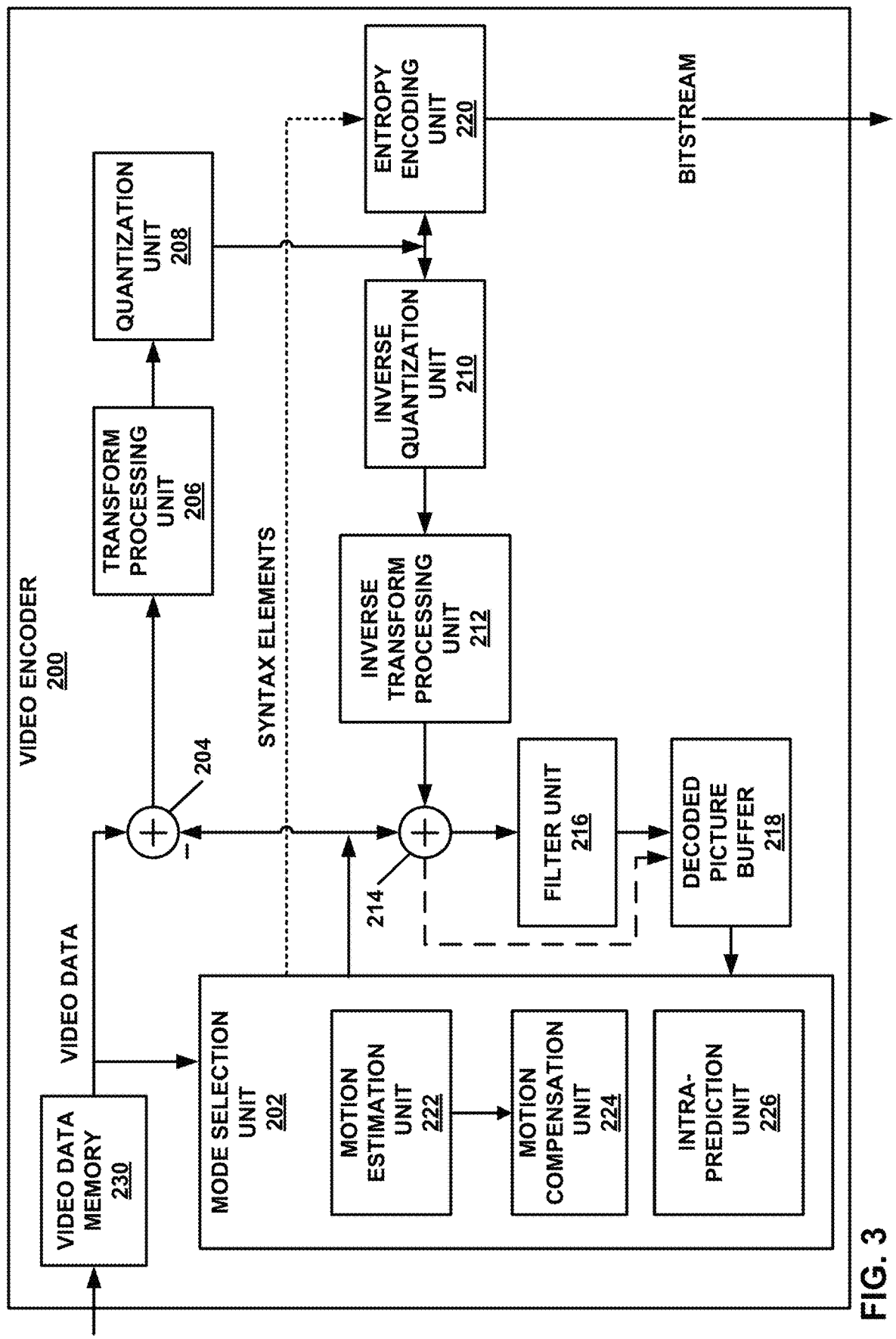
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development (e.g., VCC). However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block. Thus, Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. As illustrated by dashed lines, operations of filter unit 216 may be skipped in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a CABAC operation, context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in circuitry and configured to perform the example encoding operations described in this disclosure including the operations for the various interactions between intra block copy and the different coding modes described above.

Figure 4:
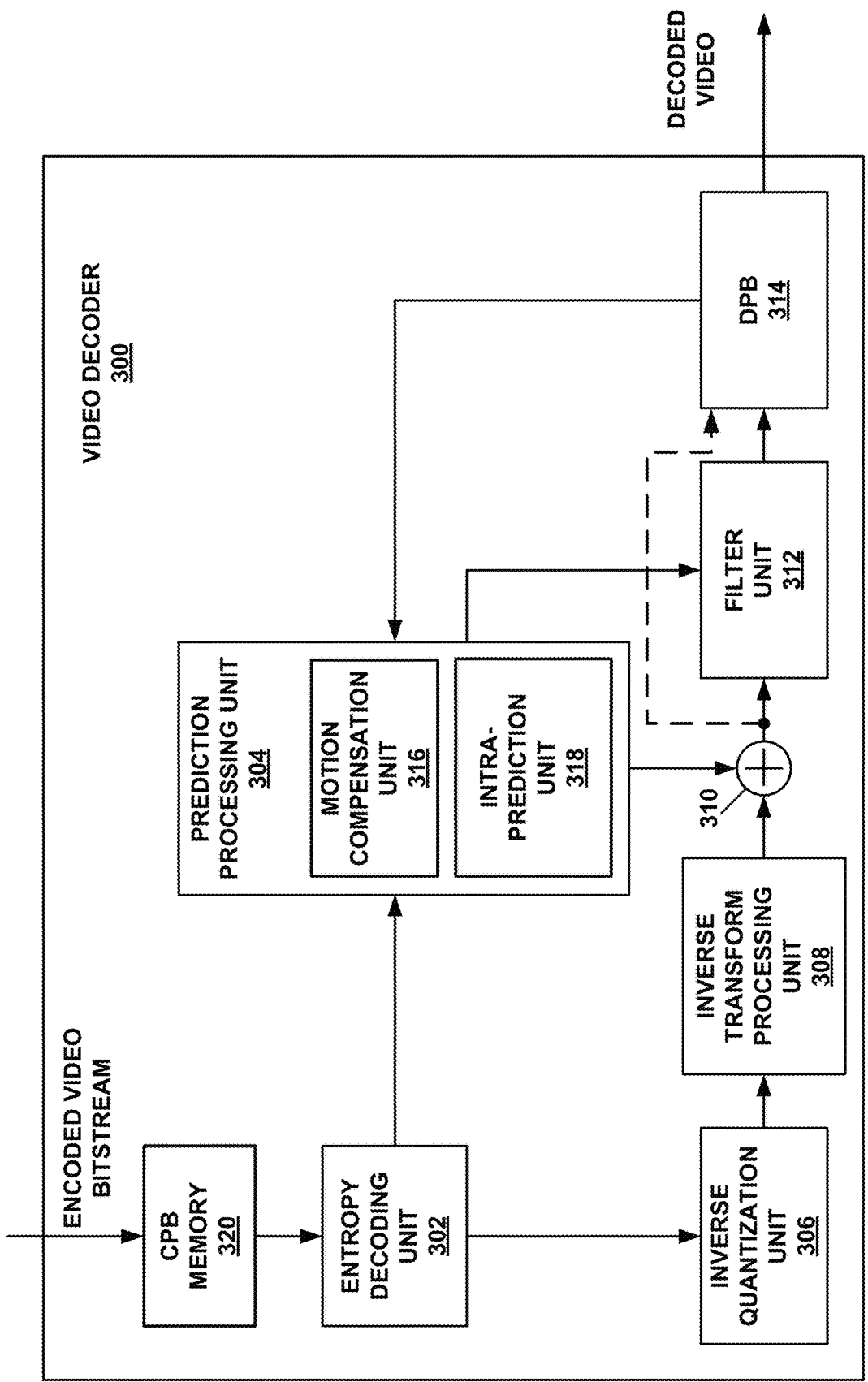
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 is described according to the techniques of JEM and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. As illustrated by the dashed lines in FIG. 4, operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to perform the example decoding operations described in this disclosure, including the operations for the various interactions between intra block copy and the different coding modes described above.

Figure 19:
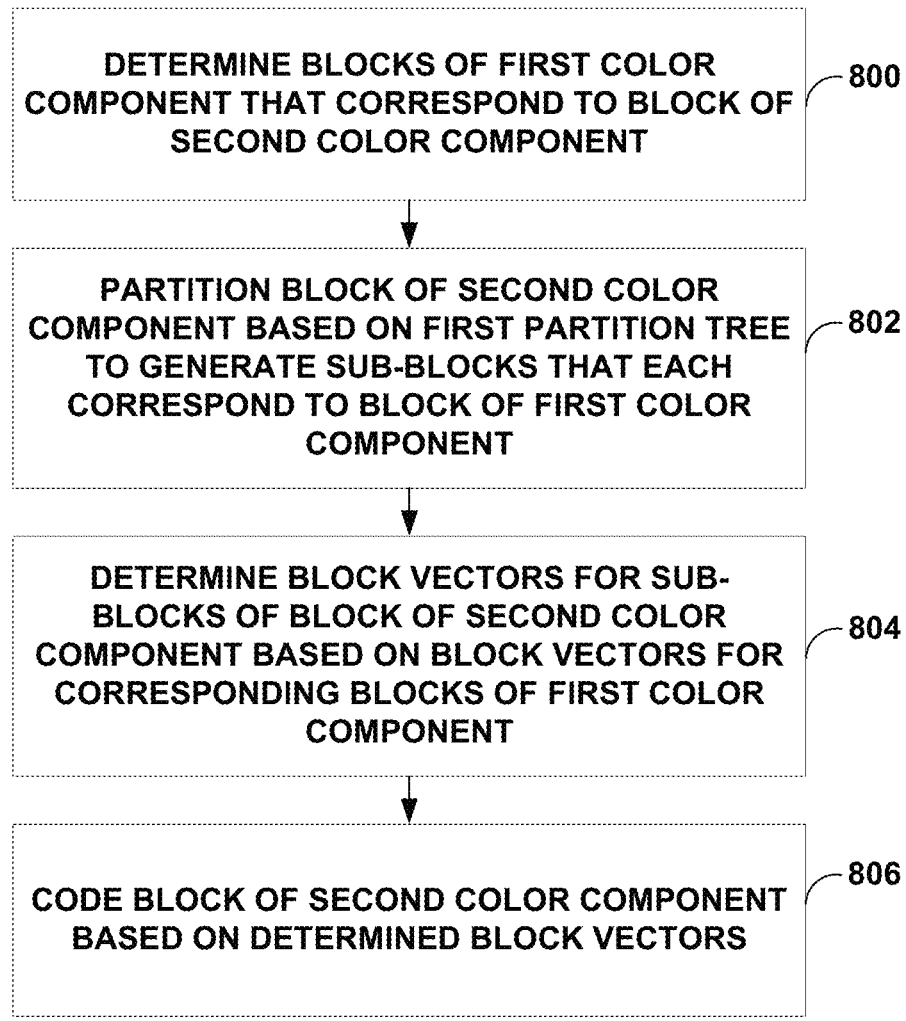
FIG. 19 is a flowchart illustrating an example method of coding video data.

FIG. 19 is a flowchart illustrating an example method of coding video data. For ease of description, the example techniques are described with respect to a video coder (e.g., video encoder 200 or video decoder 300) configured to code (e.g., encode or decode). In the example illustrated in FIG. 19, the video coder may retrieve video data such as samples of a first color component and a second color component from memory (e.g., video data memory 230, DPB 218, or some other video data memory for video encoder 200 or CPB memory 320, DPB 314, or some other video data memory for video decoder 300).

Video encoder 200 may partition samples of a first color component according to a first partition tree and partition samples of a second color component according to a second partition tree. Video encoder 200 may signal video decoder 300 information indicative of the partitioning such that video decoder 300 may determine which for which blocks video decoder 300 is receiving information.

In examples described in this disclosure, the second partition tree is different than the first partition tree, and the second color component is different than the first color component. The first color component is a luma component and the second color component is a chroma component, or vice-versa. As one example, the video coder may partition samples of the first color component according to the luma QTBT structure, as illustrated in FIGS. 2B, 17A, and 18A. The video coder may partition samples of the second color component according the chroma QTBT structure as illustrated in FIG. 17B.

The video coder may determine a plurality of blocks of the first color component that correspond to a block of the second color component (800). As described above, the plurality of blocks of the first color component are generated from partitioning of samples of the first color component according to a first partition tree (e.g., luma QTBT structure of FIGS. 2B, 17A, and 18A), and the block of the second color component is generated from partitioning of samples of the second color component according to a second partition tree (e.g., chroma QTBT structure of FIG. 17B). The plurality of blocks of the first color component and the block of the second color component may be each part of a same coding block of a picture of the video data.

For instance, to determine the plurality of blocks of the first color component that correspond to a block of the second color component, the video coder may determine the location of the plurality of blocks of the first color component and the block of the second color component, whether the samples values of the blocks of the first color component and the sample values of the block of the second color component together form sample values of samples of a coding block, and the like. As an example, luma partition 701 that includes a plurality of luma blocks corresponds with chroma block 706. The samples values of luma partition 701 and chroma block 706 together form sample values of samples of a CU (e.g., a first sample of luma partition 701 and a first sample of chroma block 706 together form a first sample of the CU, a second sample of luma partition 701 and a second sample of chroma block 706 together form a second sample of the CU, and so forth).

The video coder may partition the block of the second color component based on the first partition tree to generate sub-blocks of the second color component that each correspond to a block of the plurality of blocks of the first color component (802). For instance, as illustrated in FIG. 18B, the video coder may partition chroma block 706 in chroma partition 710 that includes sub-blocks 708A and 708B. Chroma sub-blocks 708A and 708B each correspond to luma block 704A and luma block 704B, respectively. For example, a first sample of luma block 704A and a first sample of chroma sub-block 708A together form a first sample of the CU, a second sample of luma block 704A and a second sample of chroma sub-block 708A together form a second sample of the CU, and so forth. Similarly, a first sample of luma block 704B and a first sample of chroma sub-block 708B together form a third sample of the CU, a second sample of luma block 704B and a second sample of chroma sub-block 708B together form a fourth sample of the CU, and so forth.

In one or more examples, the video coder may determine one or more block vectors for one or more of the sub-blocks of the second color component that are predicted in intra-block copy (IBC) prediction mode based on one or more block vectors of one or more corresponding blocks of the plurality of blocks of the first color component (804). For example, the video coder may determine that the block of the second color component is to inherit the one or more block vectors of the one or more corresponding blocks of the plurality of blocks of the first color component (e.g., based on signaled information such as reference index into a reference picture list).

Responsive to determining that the block of the second color component is to inherit the one or more block vectors of the one or more corresponding blocks of the plurality of blocks of the first color component, the video coder may determine the one or more block vectors for the one or more sub-blocks that are predicted in the IBC prediction mode based on the one or more block vectors of one or more corresponding blocks of the plurality of blocks of the first color component. For example, the video coder may determine that chroma sub-blocks 708A and 708B are to inherit the block vectors of luma blocks 704A and 704B, and in response, the video coder may determine the block vectors for chroma sub-blocks 708A and 708B based on the block vectors of luma blocks 704A and 704B.

In some examples, to determine the one or more block vectors for one or more sub-blocks, the video coder may be configured to scale the one or more block vectors of the one or more corresponding blocks of the plurality of blocks of the first color component based on a sub-sampling format of the first color component and the second color component. For instance, in FIGS. 18A and 18B, the 4:2:2 subsampling format is used, and therefore, the video coder divides both the x- and y-components of the block vectors for luma blocks 704A and 704B to determine the block vectors for sub-blocks 708A and 708B, respectively.

Also, in some examples, at least one of the plurality of block vectors for one of the chroma sub-blocks is different than another of the plurality of block vectors for another of the chroma sub-blocks. For instance, the block vector for chroma sub-block 708A is different than the block vector chroma sub-block 708B.

The video coder may be configured to code the block of the second color component based on the one or more determined block vectors (806). In examples where the video coder is video encoder 200, video encoder 200 may be configured to encode the block of the second color component based on the one or more determined block vectors. For instance, video encoder 200 may be configured to determine one or more prediction blocks based on the one or more determined block vectors for the one or more sub-blocks, subtract the one or more prediction blocks from respective one or more sub-blocks to generate one or more residual blocks, and signal information indicative of the one or more residual blocks.

In examples where the video coder is video decoder 300, video decoder 300 may be configured to decode the block of the second color component based on the one or more determined block vectors. For instance, video decoder 300 may be configured to determine one or more prediction blocks based on the one or more determined block vectors for the one or more sub-blocks, determine one or more residual blocks (e.g., based on signaled information) for the one or more sub-blocks, and add the one or more residual blocks to respective one or more prediction blocks to reconstruct the sub-blocks of the block of the second color component.

As described above, this disclosure describes techniques of applying IBC prediction mode with video coding techniques. For example, assume that the block of the second color component of FIG. 19 is a first block in a first picture. In some examples, the video coder may be configured to determine that a second block in a second picture of the first color component or the second color component is not predicted in the IBC prediction mode, determine a first set of motion vector precisions for the second block, determine that a third block of the first color component or the second color component is predicted in the IBC prediction mode, and determine a second set of motion vector precisions for the third block, wherein the second set of motion vector precisions is a subset of the first set of motion vector precisions.

As another example, assume that the block of the second color component of FIG. 19 is a first block in a first picture. In some examples, the video coder may be configured to determine that a second block in a second picture of the first color component or the second color component is predicted using alternative temporal motion vector prediction (ATMVP), determine one or more blocks in a reference picture used for performing ATMVP on the second block, determine that at least one block of the one or more blocks in the reference picture is predicted in the IBC prediction mode, and perform an ATMVP operation for the second block without using a block vector used for the at least one block in the reference picture that is predicted in the IBC prediction mode.

As another example, assume that the block of the second color component of FIG. 19 is a first block in a first picture. In some examples, the video coder may be configured to determine that a second block in a second picture is coded in the IBC prediction mode, and at least one of avoid signaling or parsing of information indicative of whether affine mode is enabled for the second block based on the determination that the second block is coded in the IBC prediction mode. For instance, video encoder 200 may not signal information indicative of whether affine mode is enabled for the second block, and video decoder 300 not may parse information indicative of whether affine mode is enabled for the second block.

As another example, assume that the block of the second color component of FIG. 19 is a first block in a first picture. In some examples, the video coder may be configured to determine that a second block in a second picture is coded in the IBC prediction mode, and at least one of avoid signaling or parsing of information indicative of whether illumination compensation (IC) mode is enabled for the second block based on the determination that the second block is coded in the IBC prediction mode. For instance, video encoder 200 may not signal information indicative of whether IC mode is enabled for the second block, and video decoder 300 may not parse information indicative of whether IC mode is enabled for the second block.

As another example, assume that the block of the second color component of FIG. 19 is a first block in a first picture. In some examples, the video coder may be configured to determine that a second block in a second picture is coded with a vector that refers to the second picture and may avoid performing bi-direction optical flow (BIO) on the second block based on the second block being coded with the vector that refers to the second picture.

As another example, assume that the block of the second color component of FIG. 19 is a first block in a first picture. In some examples, the video coder may be configured to determine that a second block in a second picture is coded with a vector that refers to the second picture and may avoid performing bi-literal matching on the second block based on the second block being coded with the vector that refers to the second picture.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
determining a plurality of blocks of a first color component that correspond to a block of a second color component, wherein the plurality of blocks of the first color component are generated from partitioning of samples of the first color component according to a first partition tree, and the block of the second color component is generated from partitioning of samples of the second color component according to a second partition tree;
partitioning the block of the second color component based on the first partition tree to generate sub-blocks of the second color component that each correspond to a block of the plurality of blocks of the first color component;
determining one or more block vectors for one or more of the sub-blocks of the second color component that are predicted in intra-block copy (IBC) prediction mode based on one or more block vectors of one or more corresponding blocks of the plurality of blocks of the first color component; and
coding the block of the second color component based on the one or more determined block vectors,
wherein the block of the second color component comprises a first block in a first picture, the method further comprising:
determining that a second block in a second picture of the first color component or the second color component is predicted using alternative temporal motion vector prediction (ATMVP);
determining one or more blocks in a reference picture used for performing ATMVP on the second block;
determining that at least one block of the one or more blocks in the reference picture is predicted in the IBC prediction mode; and
performing an ATMVP operation for the second block without using a block vector used for the at least one block in the reference picture that is predicted in the IBC prediction mode.

2. The method of claim 1, wherein determining the one or more block vectors for one or more sub-blocks comprises determining a plurality of block vectors for a plurality of sub-blocks, and wherein at least one of the plurality of block vectors for one of the sub-blocks is different than another of the plurality of block vectors for another of the sub-blocks.

3. The method of claim 1, wherein determining the one or more block vectors for one or more sub-blocks comprises scaling the one or more block vectors of the one or more corresponding blocks of the plurality of blocks of the first color component based on a sub-sampling format of the first color component and the second color component.

4. The method of claim 1, wherein the first color component comprises a luma component, and wherein the second color component comprises a chroma component.

5. The method of claim 1, further comprising:
determining that the block of the second color component is to inherit the one or more block vectors of the one or more corresponding blocks of the plurality of blocks of the first color component,
wherein determining the one or more block vectors for the one or more of the sub-blocks of the second color component comprises, responsive to determining that the block of the second color component is to inherit the one or more block vectors of the one or more corresponding blocks of the plurality of blocks of the first color component, determining the one or more block vectors for the one or more sub-blocks that are predicted in the IBC prediction mode based on the one or more block vectors of the one or more corresponding blocks of the plurality of blocks of the first color component.

6. The method of claim 1, wherein the plurality of blocks of the first color component and the block of the second color component are each part of a same coding block of a picture of the video data.

7. The method of claim 1, further comprising:
determining that a third block in a third picture of the first color component or the second color component is not predicted in the IBC prediction mode;
determining a first set of motion vector precisions for the third block;
determining that a fourth block of the first color component or the second color component is predicted in the IBC prediction mode; and
determining a second set of motion vector precisions for the fourth block, wherein the second set of motion vector precisions is a subset of the first set of motion vector precisions.

8. The method of claim 1, further comprising:
determining that a third block in a third picture is coded in the IBC prediction mode; and
at least one of avoiding signaling or parsing of information indicative of whether affine mode is enabled for the third block based on the determination that the third block is coded in the IBC prediction mode.

9. The method of claim 1, further comprising:
determining that a third block in a third picture is coded in the IBC prediction mode; and
at least one of avoiding signaling or parsing of information indicative of whether illumination compensation (IC) mode is enabled for the third block based on the determination that the third block is coded in the IBC prediction mode.

10. The method of claim 1, further comprising:
determining that a third block in a third picture is coded with a vector that refers to the third picture; and
avoiding performing bi-directional optical flow (BIO) on the third block based on the third block being coded with the vector that refers to the third picture.

11. The method of claim 1, further comprising:
determining that a third block in a third picture is coded with a vector that refers to the third picture; and
avoiding performing bi-literal matching on the third block based on the third block being coded with the vector that refers to the third picture.

12. The method of claim 1, wherein coding the block of the second color component comprises decoding the block of the second color component, and wherein decoding the block of the second color component comprises:
determining one or more prediction blocks based on the one or more determined block vectors for the one or more sub-blocks;
determining one or more residual blocks for the one or more sub-blocks; and
adding the one or more residual blocks to respective one or more prediction blocks to reconstruct the sub-blocks of the block of the second color component.

13. The method of claim 1, wherein coding the block of the second color component comprises encoding the block of the second color component, and wherein encoding the block of the second color component comprises:
determining one or more prediction blocks based on the one or more determined block vectors for the one or more sub-blocks;
subtracting the one or more prediction blocks from respective ones of the one or more sub-blocks to generate one or more residual blocks; and
signaling information indicative of the one or more residual blocks.

14. A device for coding video data, the device comprising:
a memory configured to store samples of a first color component and samples of a second color component of the video data; and
a video coder comprising at least one of programmable and fixed-function circuitry, wherein the video coder is configured to:
determine a plurality of blocks of a first color component that correspond to a block of a second color component, wherein the plurality of blocks of the first color component are generated from partitioning of samples of the first color component according to a first partition tree, and the block of the second color component is generated from partitioning of samples of the second color component according to a second partition tree;
partition the block of the second color component based on the first partition tree to generate sub-blocks of the second color component that each correspond to a block of the plurality of blocks of the first color component;
determine one or more block vectors for one or more of the sub-blocks of the second color component that are predicted in intra-block copy (IBC) prediction mode based on one or more block vectors of one or more corresponding blocks of the plurality of blocks of the first color component; and
code the block of the second color component based on the one or more determined block vectors,
wherein the block of the second color component comprises a first block, and wherein the video coder is configured to:
determine that a second block of the first color component or the second color component is predicted using alternative temporal motion vector prediction (ATMVP);
determine one or more blocks in a reference picture used for performing ATMVP on the second block;
determine that at least one block of the one or more blocks in the reference picture is predicted in the IBC prediction mode; and
perform an ATMVP operation for the second block without using a block vector used for the at least one block in the reference picture that is predicted in the IBC prediction mode.

15. The device of claim 14, wherein to determine the one or more block vectors for one or more sub-blocks, the video coder is configured to determine a plurality of block vectors for a plurality of sub-blocks, and wherein at least one of the plurality of block vectors for one of the sub-blocks is different than another of the plurality of block vectors for another of the sub-blocks.

16. The device of claim 14, wherein to determine the one or more block vectors for one or more sub-blocks, the video coder is configured to scale the one or more block vectors of the one or more corresponding blocks of the plurality of blocks of the first color component based on a sub-sampling format of the first color component and the second color component.

17. The device of claim 14, wherein the first color component comprises a luma component, and wherein the second color component comprises a chroma component.

18. The device of claim 14, wherein the video coder is configured to:
   determine that the block of the second color component is to inherit the one or more block vectors of the one or more corresponding blocks of the plurality of blocks of the first color component,
   wherein to determine the one or more block vectors for the one or more of the sub-blocks of the second color component, the video coder is configured to, responsive to determining that the block of the second color component is to inherit the one or more block vectors of the one or more corresponding blocks of the plurality of blocks of the first color component, determine the one or more block vectors for the one or more sub-blocks that are predicted in the IBC prediction mode based on the one or more block vectors of the one or more corresponding blocks of the plurality of blocks of the first color component.

19. The device of claim 14, wherein the plurality of blocks of the first color component and the block of the second color component are each part of a same coding block of a picture of the video data.

20. The device of claim 14, wherein the video coder is configured to:
   determine that a third block in a third picture of the first color component or the second color component is not predicted in the IBC prediction mode;
   determine a first set of motion vector precisions for the third block;
   determine that a fourth block of the first color component or the second color component is predicted in the IBC prediction mode; and
   determine a second set of motion vector precisions for the fourth block, wherein the second set of motion vector precisions is a subset of the first set of motion vector precisions.

21. The device of claim 14, wherein the video coder is configured to:
   determine that a third block in a third picture is coded in the IBC prediction mode; and
   at least one of avoid signaling or parsing of information indicative of whether affine mode is enabled for the third block based on the determination that the third block is coded in the IBC prediction mode.

22. The device of claim 14, wherein the video coder is configured to:
   determine that a third block in a third picture is coded in the IBC prediction mode; and
   at least one of avoid signaling or parsing of information indicative of whether illumination compensation (IC) mode is enabled for the third block based on the determination that the third block is coded in the IBC prediction mode.

23. The device of claim 14, wherein the video coder is configured to:
   determine that a third block in a third picture is coded with a vector that refers to the third picture; and
   avoid performing bi-directional optical flow (BIO) on the third block based on the third block being coded with the vector that refers to the third picture.

24. The device of claim 14, wherein the video coder is configured to:
   determine that a third block in a third picture is coded with a vector that refers to the third picture; and
   avoid performing bi-literal matching on the third block based on the third block being coded with the vector that refers to the third picture.

25. The device of claim 14, wherein the video coder comprises a video decoder, wherein to code the block of the second color component, the video decoder is configured to decode the block of the second color component, and wherein to decode the block of the second color, the video decoder is configured to:
   determine one or more prediction blocks based on the one or more determined block vectors for the one or more sub-blocks;
   determine one or more residual blocks for the one or more sub-blocks; and
   add the one or more residual blocks to respective one or more prediction blocks to reconstruct the sub-blocks of the block of the second color component.

26. The device of claim 14, wherein the video coder comprises a video encoder, wherein to code the block of the second color component, the video encoder is configured to encode the block of the second color component, and wherein to encode the block of the second color, the video encoder is configured to:
   determine one or more prediction blocks based on the one or more determined block vectors for the one or more sub-blocks;
   subtract the one or more prediction blocks from respective ones of the one or more sub-blocks to generate one or more residual blocks; and
   signal information indicative of the one or more residual blocks.

27. A computer-readable storage medium storing instruction that when executed cause one or more processors for a device for coding video data to:
   determine a plurality of blocks of a first color component that correspond to a block of a second color component, wherein the plurality of blocks of the first color component are generated from partitioning of samples of the first color component according to a first partition tree, and the block of the second color component is generated from partitioning of samples of the second color component according to a second partition tree;
   partition the block of the second color component based on the first partition tree to generate sub-blocks of the second color component that each correspond to a block of the plurality of blocks of the first color component;
   determine one or more block vectors for one or more of the sub-blocks of the second color component that are predicted in intra-block copy (IBC) prediction mode based on one or more block vectors of one or more corresponding blocks of the plurality of blocks of the first color component; and code the block of the second color component based on the one or more determined block vectors, wherein the block of the second color component comprises a first block in a first picture, and wherein the instructions further comprise instructions that when executed cause one or more processors to:

determine that a second block in a second picture of the first color component or the second color component is predicted using alternative temporal motion vector prediction (ATMVP);

determine one or more blocks in a reference picture used for performing ATMVP on the second block;

determine that at least one block of the one or more blocks in the reference picture is predicted in the IBC prediction mode; and perform an ATMVP operation for the second block without using a block vector used for the at least one block in the reference picture that is predicted in the IBC prediction mode.

28. A device for coding video data comprising:

means for determining a plurality of blocks of a first color component that correspond to a block of a second color component, wherein the plurality of blocks of the first color component are generated from partitioning of samples of the first color component according to a first partition tree, and the block of the second color component is generated from partitioning of samples of the second color component according to a second partition tree;

means for partitioning the block of the second color component based on the first partition tree to generate sub-blocks of the second color component that each correspond to a block of the plurality of blocks of the first color component;

means for determining one or more block vectors for one or more of the sub-blocks of the second color component that are predicted in intra-block copy (IBC) prediction mode based on one or more block vectors of one or more corresponding blocks of the plurality of blocks of the first color component; and means for coding the block of the second color component based on the one or more determined block vectors, wherein the block of the second color component comprises a first block in a first picture, the device further comprising:

means for determining that a second block in a second picture of the first color component or the second color component is predicted using alternative temporal motion vector prediction (ATMVP);

means for determining one or more blocks in a reference picture used for performing ATMVP on the second block;

means for determining that at least one block of the one or more blocks in the reference picture is predicted in the IBC prediction mode; and means for performing an ATMVP operation for the second block without using a block vector used for the at least one block in the reference picture that is predicted in the IBC prediction mode.

* * * * *